(12) United States Patent
Al-Rawashdeh et al.

(10) Patent No.: US 9,568,320 B2
(45) Date of Patent: Feb. 14, 2017

(54) METHOD AND APPARATUS FOR ESTIMATION OF CENTER OF GRAVITY USING ACCELEROMETERS

(71) Applicant: KING FAHD UNIVERSITY OF PETROLEUM AND MINERALS, Dhahran (SA)

(72) Inventors: Yazan Mohammad Al-Rawashdeh, Amman (JO); Moustafa Elshafei Ahmed Elshafei, Waterloo (CA); Mohammad Fahd Al-Malki, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 20 days.

(21) Appl. No.: 14/704,650

(22) Filed: May 5, 2015

(65) Prior Publication Data
US 2016/0327394 A1 Nov. 10, 2016

(51) Int. Cl.
*G01C 21/16* (2006.01)
(52) U.S. Cl.
CPC ..................... *G01C 21/16* (2013.01)
(58) Field of Classification Search
CPC .......................................................... G01C 21/16
USPC .......................................................... 701/504
See application file for complete search history.

(56) References Cited

U.S. PATENT DOCUMENTS

| 7,317,184 | B2* | 1/2008 | Kasevich | G01C 19/58 250/251 |
| 7,522,999 | B2* | 4/2009 | Wence | G01C 21/28 701/502 |
| 7,962,285 | B2* | 6/2011 | Breed | G01C 21/12 701/472 |
| 8,395,542 | B2 | 3/2013 | Scherzinger et al. | |
| 9,052,202 | B2* | 6/2015 | Riley | G01C 21/165 |
| 9,213,046 | B2* | 12/2015 | Wang | G01C 21/16 |
| 9,261,980 | B2* | 2/2016 | Bassompiere | G01C 21/16 |
| 2004/0188561 | A1* | 9/2004 | Ratkovic | F41G 7/346 244/3.15 |
| 2006/0156810 | A1* | 7/2006 | Brett | G01P 1/023 73/382 G |
| 2009/0254294 | A1 | 10/2009 | Dutta | |
| 2010/0153050 | A1* | 6/2010 | Zumberge | G01V 7/16 702/92 |
| 2011/0265563 | A1* | 11/2011 | Van Kann | G01V 7/02 73/382 G |

(Continued)

FOREIGN PATENT DOCUMENTS

WO    WO 2008/111100 A1    9/2008

OTHER PUBLICATIONS

Al-Rawashdeh, Yazan Mohammad, Moustafa Elshafei, and Mohammad Fahad Al-Malki. "In-Flight Estimation of Center of Gravity Position Using All-Accelerometers." Sensors (Basel, Switzerland) 14.9 (2014): 17567-17585. PMC. Web. May 5, 2015.

(Continued)

*Primary Examiner* — Atul Trivedi
(74) *Attorney, Agent, or Firm* — Oblon, McClelland, Maier & Neustadt, L.L.P.

(57) ABSTRACT

A system and associated methodology determine navigation parameters of a vehicle under varying center of gravity position and varying unknown gravitational forces. The system uses high precision accelerometers arranged in a plurality of configurations.

20 Claims, 13 Drawing Sheets

(56) References Cited

U.S. PATENT DOCUMENTS

2012/0226395 A1* 9/2012 Revol .................... G01C 21/16
                                                                  701/4
2014/0081595 A1* 3/2014 White .................... G01V 7/06
                                                                  702/154

OTHER PUBLICATIONS

Ezzaldeen Edwan "Novel Approaches for Improved Performance of Inertial Sensors and Integrated Navigation Systems". University Library of the University of Siegen (Siegen, Germany) (2013): Ph.D. Dissertation. Web. May 5, 2015. http://d-nb.info/103442596X/34.

* cited by examiner

METHOD AND APPARATUS FOR ESTIMATION OF CENTER OF GRAVITY USING ACCELEROMETERS

BACKGROUND

Dynamic equations of an aircraft vehicle are derived under the assumption of a known and stationary Center of Gravity (CoG). Variations in loads result in a change in both of the aircraft vehicle's mass and the CoG position. The change in the CoG introduces undesirable couplings in flights dynamics. The variations in loads may be due to fuel consumption or change in payload of the aircraft vehicle. Knowledge of the CoG position is important for determination of the aircraft vehicle attitude, calculation of the various aerodynamics forces and torques, selection of the proper control strategy, and ensuring the aircraft vehicle stability.

An apparatus for tracking the center of gravity of an air vehicle was described in U.S. Pat. No. 8,260,477B2 entitled "METHOD AND APPARATUS FOR TRACKING CENTER OF GRAVITY OF AIR VEHICLE", the entire disclosure of which is incorporated herein by reference. The apparatus estimates the angular velocity of the air vehicle from accelerometers measurements. The estimated vehicle angular velocity is then used to calculate both a center of gravity position and an inertial acceleration with respect to the vehicle's body frame using a suitable identification technique for a linear-in-parameters system. The estimation of the angular velocity may suffer from instability due to unstable nonlinear equations used. The accelerometers were arranged on rings. The rings are fitted into fore and aft positions of the air vehicles which impose some constraints on the airframe design.

A passive navigation system (PNS) was described in U.S. Pat. No. 6,014,103 entitled "PASSIVE NAVIGATION SYSTEM", the entire disclosure of which is incorporated herein by reference. The PNS comprises an IMU that contains gyroscopes and accelerometers to provide the needed inertial information.

An autonomous covert Inertial Navigation System (INS) uniquely suited for underwater applications is described in U.S. Pat. No. 5,339,684 entitled "GRAVITY AIDED INERTIAL NAVIGATION SYSTEM", the entire disclosure of which is incorporated herein by reference. The autonomous covert INS deals with errors correction where it ensures the Schuler and Sidereal errors are bounded. The autonomous covert INS utilizes a gradiometer, a gravimeter, and an inertial navigation system (INS) to facilitate its functionality. It can be used while navigating in varying gravity fields. However, the autonomous covert INS does not handle the Center of Gravity (CoG) shift.

A fault tolerant inertial reference system is described in U.S. Pat. No. 5,719,764 entitled "FAULT TOLERANT INERTIAL REFERENCE SYSTEM", the entire disclosure of which is incorporated herein by reference. The fault tolerant inertial reference system employs two independent inertial reference units. Each unit utilizes global positioning system (GPS) information such as velocity and position. It also provides maximum level of fault tolerance with a minimum set of redundant inertial sensors where the faulty sensors can be isolated. It also provides means to correct the errors arising from the inertial sensors. However, it does not deal with the varying position of the CoG and varying gravity.

Therefore, there is a need for a method and system for determining the center of gravity position and the position rate of change under the influence of varying unknown gravitational force.

The foregoing "background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention. The foregoing paragraphs have been provided by way of general introduction, and are not intended to limit the scope of the following claims. The described embodiments, together with further advantages, will be best understood by reference to the following detailed description taken in conjunction with the accompanying drawings.

SUMMARY

The present disclosure relates to a method for determining navigation parameters of a vehicle that receives measurements from at least one accelerometer, calculates, using processing circuitry, differential accelerometers measurements based on the measurements, calculates an angular acceleration based on the differential accelerometers measurements, filters the angular acceleration to obtain an angular velocity, and calculates the navigation parameters using an identification technique.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
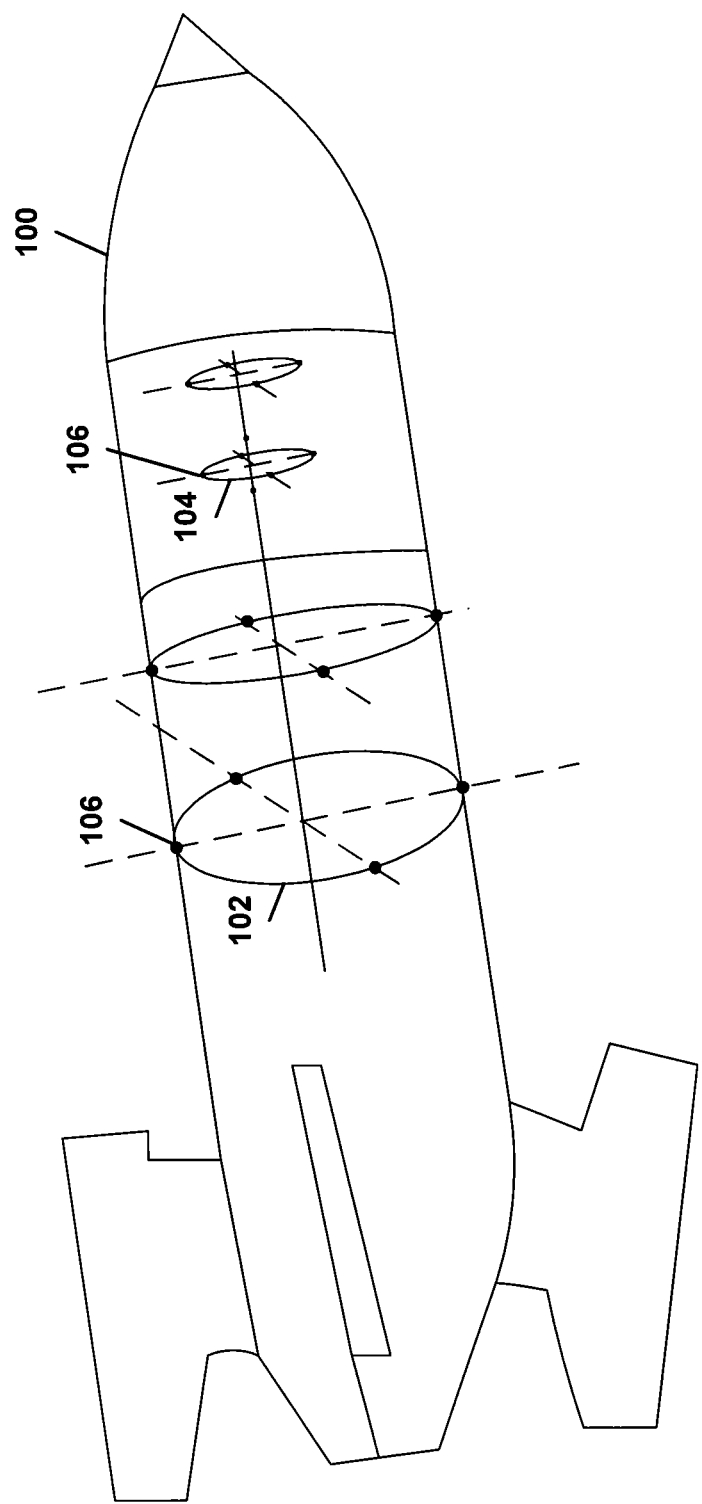
FIG. 1 is a schematic diagram of sensors for estimating a center of gravity of a vehicle according to one example.

Referring now to the drawings, wherein like reference numerals designate identical or corresponding parts throughout several views, the following description relates to a system, apparatus, and associated methodology for enhanced navigation.

The system of the present disclosure may be used in various military applications and other exploration missions. The system may also determine a gravity tensor of the vehicle, which can be used for computer guidance to avoid obstacles. The gravity tensor may also be used for gravity tensor map matching when a reference tensor is available. In one embodiment, the system of the present disclosure is a passive Inertial Navigation System (INS).

Inertial navigation units (IMUs) may produce significant errors when the gravity effect is not compensated for. In one embodiment, the system and associated methodology uses a gravity gradient estimation technique for on-line gravity estimation to compensate for the unknown gravitational acceleration sensed by motion sensors. The motion sensors may be accelerometers.

In one embodiment, the system may be a completely passive inertial navigation system (INS) that can be used in navigating under/water, under/ground, space or air vehicles where other aiding navigation devices, such as GPS, are not available. This also facilitates its usage in exploration and conducting missions with inaccurately known or completely unknown gravity models in a passive mode of operation. In other embodiments, the system may be used in addition to other aiding navigation devices.

FIG. 1 is a schematic diagram of sensors for estimating a center of gravity of a vehicle according to one example. The sensors 106 may include a plurality of accelerometers. The accelerometers may be fixed on the frame of the vehicle 100. The vehicle 100 may be a missile, a drone, an unmanned aerial vehicle (UAV), a spacecraft, a satellite, a lander, an aircraft, a watercraft, or the like. The accelerometers may be aligned with respect to three Euclidean axes fixed on the frame of the vehicle. The accelerometers may be positioned using a plurality of configurations. A first configuration 102 requires at least two rings. A second configuration 104 has a diamond configuration. Measurements from the accelerometers enable finding the angular acceleration of the body they are attached to by taking the differential of the measurements as explained below.

Figure 2:
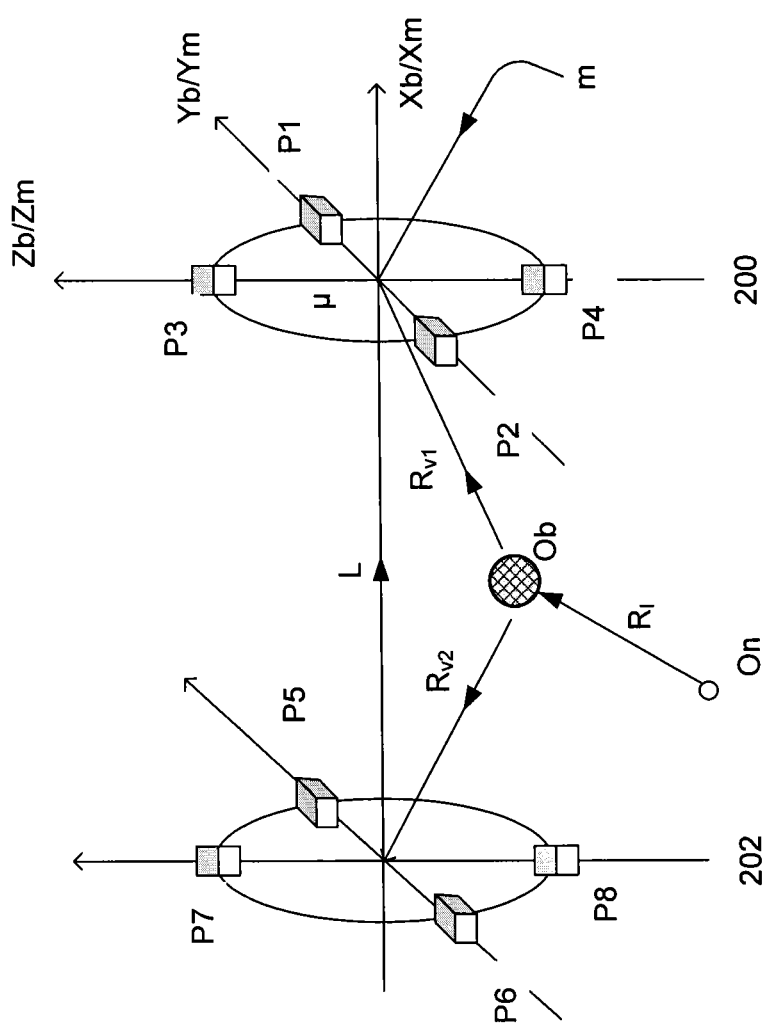
FIG. 2 is a schematic that shows a pair of rings in a first configuration according to one example.

FIG. 2 is a schematic that shows a pair of rings in a first configuration according to one example. The INS includes two or more IMUs also referred to as rings in the first configuration. In one example, as shown in FIG. 2, the INS includes a first IMU 200 and a second IMU 202. The first IMU 200 and the second IMU 202 may be aligned with the vehicle's 100 axes $(X_b Y_b Z_b)$. Each ring may include at least four tri-axial accelerometers. The four tri-axial accelerometers of the first IMU 200 and the second IMU 202 are placed symmetrically around a point m at a distance μ. The tri-axial accelerometers coordinate system $(X_m Y_m Z_m)$ may be also aligned with respect to the vehicle's 100 axes $(X_b Y_b Z_b)$. In one embodiment, the first IMU 200 includes four tri-axial accelerometers at positions P1, P2, P3, and P4. The second IMU 202 includes four tri-axial accelerometers at positions P5, P6, P7, and P8. In FIG. 2, $O_b$ represents the CoG position, $O_n$ represents the origin of a inertial coordinate system, $R_I$ is a vector from the origin $O_n$ to the CoG, L the distance between the first and the second IMU 200,202, and $R_{v1}$ and $R_{v2}$ represent the vectors from the CoG to the origin of the first and second IMU 200, 202 respectively. Each of the first and second IMU 200, 202 includes 12 accelerometers. The first and second IMUs 200, 202 further include processing circuitry. In addition, central processing circuitry is included in the INS. Measurements from the first and the second IMUs 200,202 are transmitted to the central processing circuitry.

Figure 3:
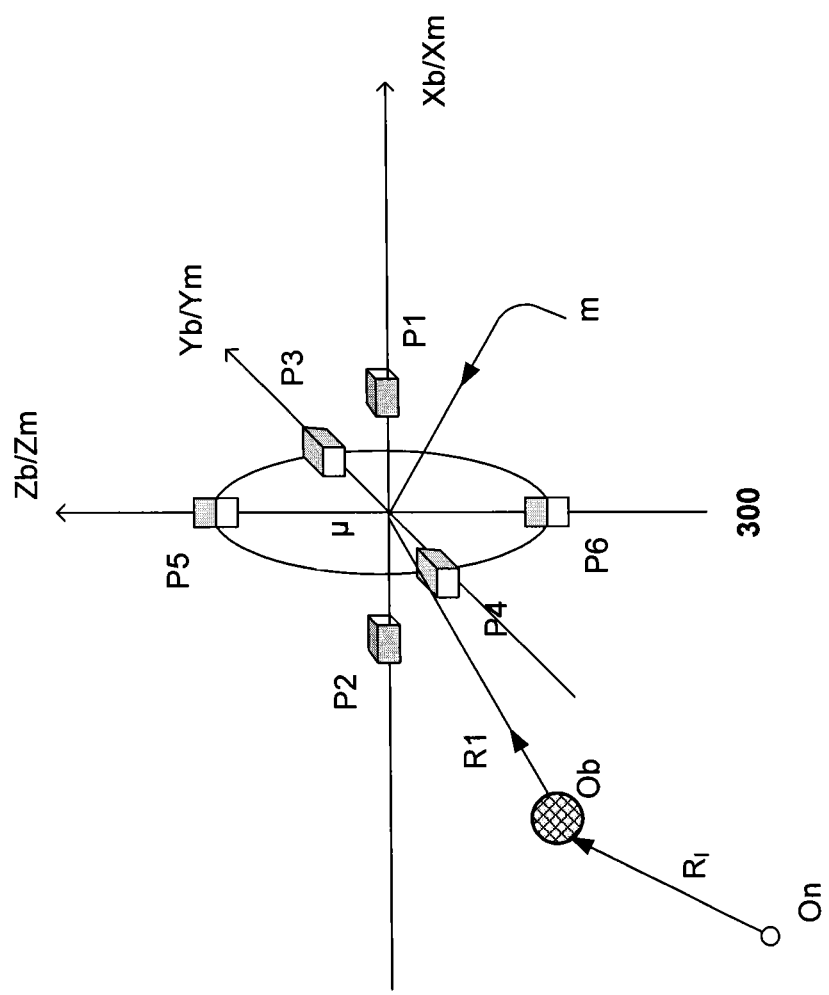
FIG. 3 is a schematic that shows a ring in a second configuration according to one example.

FIG. 3 is a schematic that shows a ring in the second configuration according to one example. The second configuration is the diamond configuration in which two linear accelerometers are separated equally around a point in three perpendicular directions. The second configuration uses a total of three pairs of tri-axial accelerometers per IMU. FIG. 3 shows a ring 300 in the second configuration. The ring 300 includes six tri-axial accelerometers at positions P1, P2, P3, P4, P5 and P6. In one embodiment, the vehicle 100 axis $(X_b Y_b Z_b)$ and the ring 300 $(X_m Y_m Z_m)$ axis are aligned. A 3D configuration used in the second configuration allows freedom in positioning the rings within the frame of the vehicle 100. The ring includes processing circuitry. IMUs using ring, in the second configuration, may be used in a decentralized approach while providing improved redundancy and reliability. Thus, the processing circuitry may be embedded in one or more rings in the second configuration.

The differences between both configurations are the number of linear accelerometers used, the installation space requirements within the airframe, being self-contained, and sensitivity to the distance between redundant rings.

As shown in FIGS. 2 and 3, the accelerometers may be placed symmetrically around the point m at a distance μ. $P_j$ is a tri-axial linear accelerometer's position, IN is the position of the CoG, $O_n$ is the origin of the inertial coordinate system, $R_I$ is the vector from inertial frame origin $O_n$ to CoG, and $R_{vi}$ is the vector from the CoG $O_b$ to origin of Ring (i), where i=1, 2, 3, . . . etc.

Adopting a flat non-rotating earth model, the acceleration at point $P_j$, shown in FIGS. 2 and 3, may be expressed as:

$$\vec{A}_j = \vec{A}_b + \ddot{\vec{R}}_{vi} + \dot{\vec{\Omega}} \times (\vec{R}_{vi} + \mu \hat{s}) + 2\vec{\Omega} \times \dot{\vec{R}}_{vi} + (\vec{\Omega} \times (\vec{R}_{vi} + \mu \hat{s})) - \vec{g}_j \quad (1)$$

where $\vec{A}_b$ is the inertial acceleration of arbitrary point P measured in a body coordinate system, $\ddot{\vec{R}}_{vi}$ is the linear acceleration of the $i^{th}$ ring with respect to the body coordinate system, $\dot{\vec{R}}_{vi}$ is the linear velocity of the $i^{th}$ ring with respect to the body coordinate system, $\vec{R}_{vi}$ is the vector from the origin of the body coordinate system to point m in the $i^{th}$ ring, $\vec{\Omega}$ is the angular velocity of the body system, $\dot{\vec{\Omega}}$ is the angular acceleration of the body system, $\vec{g}_j$ is the acceleration due to gravity sensed by the $j^{th}$ accelerometer, $\hat{s}$ is a unit vector in the appropriate primary direction, and x, denotes the cross product between two vectors.

Taking the differential accelerometers' measurements in each primary axis for the ring 300 shown in FIG. 3, the following system of equations can be obtained:

$$\vec{A}_1 - \vec{A}_2 = 2\vec{\Omega} \times \mu \hat{i} + 2\vec{\Omega} \times (\vec{Q} \times u\hat{i}) - (\vec{g}_1 - \vec{g}_2) \quad (2)$$

$$\vec{A}_3 - \vec{A}_4 = 2\vec{\Omega} \times \mu \hat{k} + 2\vec{\Omega} \times (\vec{Q} \times u\hat{j}) - (\vec{g}_3 - \vec{g}_4) \quad (3)$$

$$\vec{A}_5 - \vec{A}_6 = 2\vec{\Omega} \times \mu \hat{k} + 2\vec{\Omega} \times (\vec{Q} \times u\hat{k}) - (\vec{g}_5 - \vec{g}_6) \quad (4)$$

where, $\hat{i}$, $\hat{j}$ and $\hat{k}$ are the unit vectors in the ring's X, Y, and Z axes respectively.

Based on equations (2)-(4), in the second configuration, the gravity acceleration does not affect the angular velocity and acceleration determination using the method of the present disclosure when the precision of the accelerometers is small, for example, when using MEMS-based accelerometers. However, when the precision of the accelerometers used is high, such as found in cold-atom interferometry, then the gravity gradient can be measured and the estimation of the gravity acceleration is made possible using the second configuration. In one embodiment, at least one ring in the second configuration uses high precision accelerometers. In the first configuration, at least two rings use high precision accelerometers.

The gravity vector is a function of the position. So, it may be expressed as given in T. C. Welker, R. E. Huffman, Jr., and M. Pachter, "Use of Gravity Gradiometry in Precision Inertial Navigation systems", AIAA Guidance, Navigation, and Control Conference, August (2011) incorporated herein by reference in its entirety:

$$\vec{g} = [G_x(x(t),y(t),z(t)) G_y(x(t),y(t),z(t)) G_z(x(t),y(t),z(t))]^T \quad (5)$$

The difference between two gravity vectors is considered as the gravity gradient. The symmetric gravity gradient with respect to a body frame is given as in A. H. Zorn, "A merging of system technologies: all-accelerometer inertial navigation and gravity gradiometry," Position Location and Navigation Symposium, IEEE, (2002) incorporated herein by reference in its entirety:

$$\Gamma^a = \nabla g \cong \Delta g / (2\mu) = \begin{bmatrix} \Gamma_{xx} & \Gamma_{xy} & \Gamma_{xz} \\ \Gamma_{xy} & \Gamma_{yy} & \Gamma_{yz} \\ \Gamma_{xz} & \Gamma_{yz} & \Gamma_{zz} \end{bmatrix} \quad (6)$$

Rearranging the previous equations and taking the appropriate part of the gravity gradient according to the axes of concern, then equations (2)-(4) may be rewritten as follows:

$$\frac{\vec{A}_1 - \vec{A}_2}{2\mu} = ([\dot{\Omega}] + [\Omega \times] - \Gamma^a) \begin{bmatrix} 1 \\ 0 \\ 0 \end{bmatrix} \quad (7)$$

$$\frac{\vec{A}_3 - \vec{A}_4}{2\mu} = ([\dot{\Omega}] + [\Omega \times] - \Gamma^a) \begin{bmatrix} 0 \\ 1 \\ 0 \end{bmatrix} \quad (8)$$

$$\frac{\vec{A}_5 - \vec{A}_6}{2\mu} = ([\dot{\Omega}] + [\Omega \times] - \Gamma^a) \begin{bmatrix} 0 \\ 0 \\ 1 \end{bmatrix} \quad (9)$$

where the cross product was replaced by the multiplication of a skew symmetric matrix and a vector in the right order. The matrices ($[\dot{\Omega}]$), ($[\Omega \times]$) are given as follows:

$$[\dot{\Omega}] = \begin{bmatrix} 0 & -\dot{\Omega}_z & \dot{\Omega}_y \\ \dot{\Omega}_z & 0 & -\dot{\Omega}_x \\ -\dot{\Omega}_y & \dot{\Omega}_x & 0 \end{bmatrix}, \quad (10)$$

$$[\Omega \times] = \begin{bmatrix} -\Omega_z^2 - \Omega_y^2 & \Omega_x \Omega_y & \Omega_x \Omega_z \\ \Omega_x \Omega_y & -\Omega_z^2 - \Omega_x^2 & \Omega_z \Omega_y \\ \Omega_x \Omega_z & \Omega_z \Omega_y & -\Omega_y^2 - \Omega_x^2 \end{bmatrix}$$

By arranging the previous three equations into one-system yields:

$$\begin{bmatrix} \frac{\vec{A}_1 - \vec{A}_2}{2\mu} & \frac{\vec{A}_3 - \vec{A}_4}{2\mu} & \frac{\vec{A}_5 - \vec{A}_6}{2\mu} \end{bmatrix} = \begin{bmatrix} 0 & -\dot{\Omega}_z & \dot{\Omega}_y \\ \dot{\Omega}_z & 0 & -\dot{\Omega}_x \\ -\dot{\Omega}_y & \dot{\Omega}_x & 0 \end{bmatrix} + \quad (11)$$

$$\begin{bmatrix} -\Omega_z^2 - \Omega_y^2 & \Omega_x \Omega_y & \Omega_x \Omega_z \\ \Omega_x \Omega_y & -\Omega_z^2 - \Omega_x^2 & \Omega_z \Omega_y \\ \Omega_x \Omega_z & \Omega_z \Omega_y & -\Omega_y^2 - \Omega_x^2 \end{bmatrix} - \begin{bmatrix} \Gamma_{xx} & \Gamma_{xy} & \Gamma_{xz} \\ \Gamma_{xy} & \Gamma_{yy} & \Gamma_{yz} \\ \Gamma_{xz} & \Gamma_{yz} & \Gamma_{zz} \end{bmatrix}$$

The same steps can be taken to obtain a set of equations for the first IMU 200 in the first configuration which may be expressed as follows:

$$\begin{bmatrix} \frac{\sum_{j=1}^{4} \vec{A}_{1,j} - \sum_{j=1}^{4} \vec{A}_{2,j}}{2\mu} & \frac{\vec{A}_{1,1} - \vec{A}_{1,2}}{2\mu} & \frac{\vec{A}_{1,3} - \vec{A}_{1,4}}{2\mu} \end{bmatrix} = \quad (12)$$

$$\begin{bmatrix} 0 & -\dot{\Omega}_z & \dot{\Omega}_y \\ \dot{\Omega}_z & 0 & -\dot{\Omega}_x \\ -\dot{\Omega}_y & \dot{\Omega}_x & 0 \end{bmatrix} +$$

$$\begin{bmatrix} -\Omega_z^2 - \Omega_y^2 & \Omega_x \Omega_y & \Omega_x \Omega_z \\ \Omega_x \Omega_y & -\Omega_z^2 - \Omega_x^2 & \Omega_z \Omega_y \\ \Omega_x \Omega_z & \Omega_z \Omega_y & -\Omega_y^2 - \Omega_x^2 \end{bmatrix} - \begin{bmatrix} \Gamma_{xx} & \Gamma_{xy} & \Gamma_{xz} \\ \Gamma_{xy} & \Gamma_{yy} & \Gamma_{yz} \\ \Gamma_{xz} & \Gamma_{yz} & \Gamma_{zz} \end{bmatrix}$$

where $\vec{A}_{2,j}$ refers to the $j^{th}$ accelerometer in the second IMU 202 in the first configuration.

Each of the previous systems of equations given by equations (11) and (12) contains nine equations that need to be solved to determine the elements of the gravity tensor, and both the angular velocity and acceleration. By examining, the systems of equations given by equations (11) and (12) simple linear systems can be obtained, as shown in tables 1 and 2, by which the angular acceleration can be obtained directly using algebraic calculations. This motivates the usage of a norm-constrained Kalman filter (KF) to retrieve the angular velocities and to overcome the drift in the estimation because of the noisy accelerometers' measurements as described in R. Zanetti, J. Majji, R. H. Bishop, and D. Mortari, "Norm-Constrained Kalman Filtering", Journal of Guidance, Control, and Dynamics, (2009) incorporated herein by reference in its entirety.

TABLE 1

Angular acceleration's equations for accelerometers in the second configuration

State Equations (Second configuration)

$$\dot{\Omega}_x = \frac{1}{4\mu}(A_{3z} - A_{4z} - A_{5y} + A_{6y})$$

$$\dot{\Omega}_y = \frac{1}{4\mu}(A_{5x} - A_{6x} - A_{1z} + A_{2z})$$

$$\dot{\Omega}_z = \frac{1}{4\mu}(A_{1y} - A_{2y} - A_{3x} + A_{4x})$$

TABLE 2

Angular acceleration's equations for accelerometers in the first configuration

State Equations (First configuration)

$$\dot{\Omega}_x = \frac{1}{4\mu}(A_{1,1z} - A_{1,2z} - A_{1,3y} + A_{1,4y})$$

$$\dot{\Omega}_y = \frac{1}{2\mu}(A_{1,3x} - A_{1,4x}) - \frac{1}{L}\left(\sum_{j=1}^{4} A_{1,jz} - \sum_{j=1}^{4} A_{2,jz}\right)$$

$$\dot{\Omega}_z = -\frac{1}{2\mu}(A_{1,1x} - A_{1,2x}) + \frac{1}{L}\left(\sum_{j=1}^{4} A_{1,jy} - \sum_{j=1}^{4} A_{2,jy}\right)$$

Recalling the fact that the gravity gradient is traceless, it may be shown that the square of the magnitude of the angular velocity for the second configuration is given by:

$$\|\vec{\Omega}\|^2 = \Omega_x^2 + \Omega_y^2 + \Omega_z^2 = \frac{-1}{4\mu}(A_{1x} - A_{2x} + A_{3y} - A_{4y} + A_{5z} - A_{6z}) \quad (13)$$

and for the first configuration is given by:

$$\|\vec{\Omega}\|^2 = \Omega_x^2 + \Omega_y^2 + \Omega_z^2 = \quad (14)$$

$$\frac{1}{2L}\left(\sum_{j=1}^{4} A_{2,jx} - \sum_{j=1}^{4} A_{1,jx}\right) - \frac{1}{4\mu}(A_{1,1y} - A_{1,2y} + A_{1,3z} - A_{1,4z})$$

This is equal to the square of 2-norm of the angular velocity ($\vec{\Omega} = [\Omega_x, \Omega_y, \Omega_z]^T$). Equations (13) and (14) provide equality constraints that can be used with norm-constrained KFs to retrieve the angular velocity and at the same time can be used to provide thresholds for attitude determination. Equations (13) and (14) may not be positive, because of the noise available in the accelerometers' measurements so they should be tested before applying the constraint.

Figure 4:
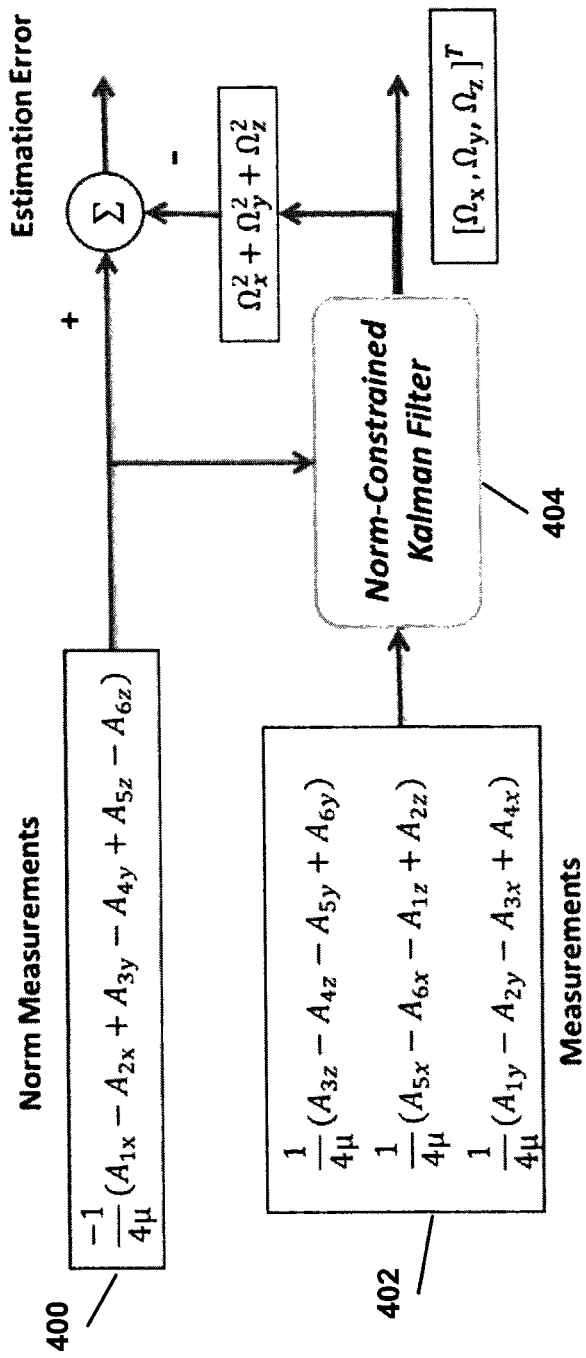
FIG. 4 is a block diagram that shows the calculation of the angular velocity according to one example.

FIG. 4 is a block diagram that shows the calculation of the angular velocity. The norm measurements module 400 calculates the square of the magnitude of the angular velocity using equation (13). The measurements module 402 calculates the angular acceleration using the state equations shown in table 1. The output of both modules 400 and 402 are fed to a Norm-constrained Kalman filter 404. Each of the modules described herein may be implemented in circuitry that is programmable (e.g. microprocessor-based circuits) or dedicated circuits such as application specific integrated circuits (ASICS) or field programmable gate arrays (FPGAS). The Norm-constrained Kalman filter 404 outputs the angular velocity. This approach reduces the effect of the estimated angular velocity on the estimated tiny values, i.e. less than of $10^{-10}$, when calculating the gravity tensor.

After estimating the angular velocity using the norm-constrained Kalman filter 404, the gravity tensor can be calculated using the following set of equations for the second configuration:

$$\Gamma_{xx} = -\frac{(A_{1x} - A_{2x})}{2\mu} - \Omega_z^2 - \Omega_y^2 \quad (15)$$

$$\Gamma_{yy} = -\frac{(A_{3y} - A_{4y})}{2\mu} - \Omega_z^2 - \Omega_x^2$$

$$\Gamma_{zz} = -\frac{(A_{5z} - A_{6z})}{2\mu} - \Omega_x^2 - \Omega_y^2$$

$$\Gamma_{xy} = -\frac{(A_{3x} - A_{4x}) + (A_{1y} - A_{2y})}{4\mu} + \Omega_x \Omega_y$$

$$\Gamma_{xz} = -\frac{(A_{5x} - A_{6x}) + (A_{1z} - A_{2z})}{4\mu} + \Omega_x \Omega_z$$

$$\Gamma_{yz} = -\frac{(A_{3z} - A_{4z}) + (A_{5y} - A_{6y})}{4\mu} + \Omega_z \Omega_y$$

The gravity tensor traceless property can also be used, where:

$$\text{trace}(\Gamma^a) = \Gamma_{xx} + \Gamma_{yy} + \Gamma_{zz} = 0. \quad (16)$$

A similar approach may be used to obtain the gravity tensor equations for the first configuration.

Figure 5:
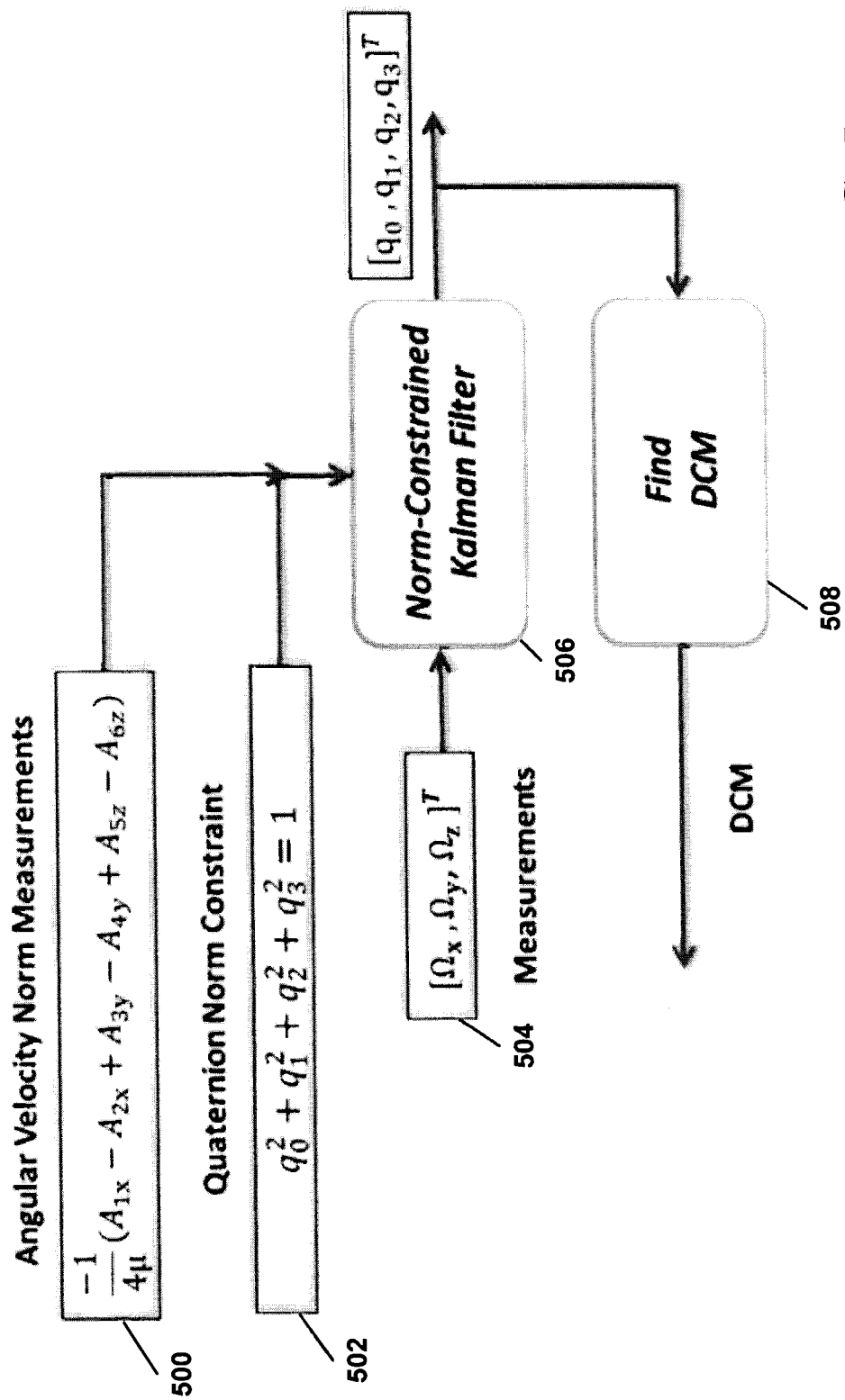
FIG. 5 is a block diagram that shows the calculation of the attitude estimation according to one example.

FIG. 5 is a block diagram that shows the calculation of the attitude estimation according to one example. A norm-constrained KF 506 may be used to solve the attitude problem given by (17).

$$\begin{bmatrix} \dot{q}_0 \\ \dot{q}_1 \\ \dot{q}_2 \\ \dot{q}_3 \end{bmatrix} = 0.5 * \begin{bmatrix} 0 & -p & -q & -r \\ p & 0 & r & -q \\ q & -r & 0 & p \\ r & q & -p & 0 \end{bmatrix} \begin{bmatrix} q_0 \\ q_1 \\ q_2 \\ q_3 \end{bmatrix} \quad (17)$$

And it makes use of quaternion norm constraints 502:

$$\|\vec{q}\|^2 = q_0^2 + q_1^2 + q_2^2 + q_3^2 = 1 \quad (18)$$

In addition to equation (18), the magnitude of the angular velocity given by equations (13) and (14) is used to build a maneuver detection threshold that is used to trigger the attitude update as shown in FIG. 5. The Norm-Constrained Kalman Filter 506 is used to retrieve the Quaternion vector which may be used to find a directional cosine matrix (DCM). The angular velocity norm measurements 500 calculate the square of the magnitude of the angular velocity using equation (13). The Norm-Constrained Kalman Filter 506 uses the quaternion norm constraint 502, the angular velocity norm measurements 500, and the angular velocity 504 calculated as shown in FIG. 4 to solve the attitude problem.

The concept of redundant rings may be utilized to reflect the position of CoG into equation (1). When two or more rings are included in the system, measurements from a faulty ring may be neglected. For example, when the measurements from a ring are out of preset boundaries. This approach helps in increasing the availability and reliability of measurements and estimation of the unknowns and make the configuration less dependent on a particular ring which allows excluding a ring's results once it is deemed faulty. When redundant rings are used, a centralized or decentralized approach can be used to fuse the measurements and estimations of the available rings. Avionic networks, or the like, can be used to connect the rings to each other and to the central processing circuitry.

Since the equations are to be derived with respect to the ring's level, it is better to refer to its center instead of referring to individual accelerometers within the same ring. This approach increases the reliability of measurements within the same ring even in the case of a particular accelerometer failure. In one embodiment, the health of each channel in an accelerometer within the ring may be checked using the method disclosed in U.S. Pat. No. 8,260,477B2 entitled "METHOD AND APPARATUS FOR TRACKING CENTER OF GRAVITY OF AIR VEHICLE", the entire disclosure of which is incorporated herein by reference. Once this approach is used, then the data processing within the ring is not dependent on its radius (μ). However, the design process of the ring is more concerned about reducing the sizing effect by choosing its radius (μ) in an optimal fashion that complies with the vehicle's constraints and the desired measurements' sensitivity.

When all the accelerometers' measurements are correct, i.e. have been checked, the acceleration at the center of the ($i^{th}$) ring may be expressed as:

$$\vec{a}_{ri} = \frac{\sum_{x=1}^{V} \vec{A}_x}{V}, i = 1, 2, \ldots N; V = \{4, 6\} \tag{19}$$

for the first and second configurations respectively, where N is the number of redundant rings.

Figure 6:
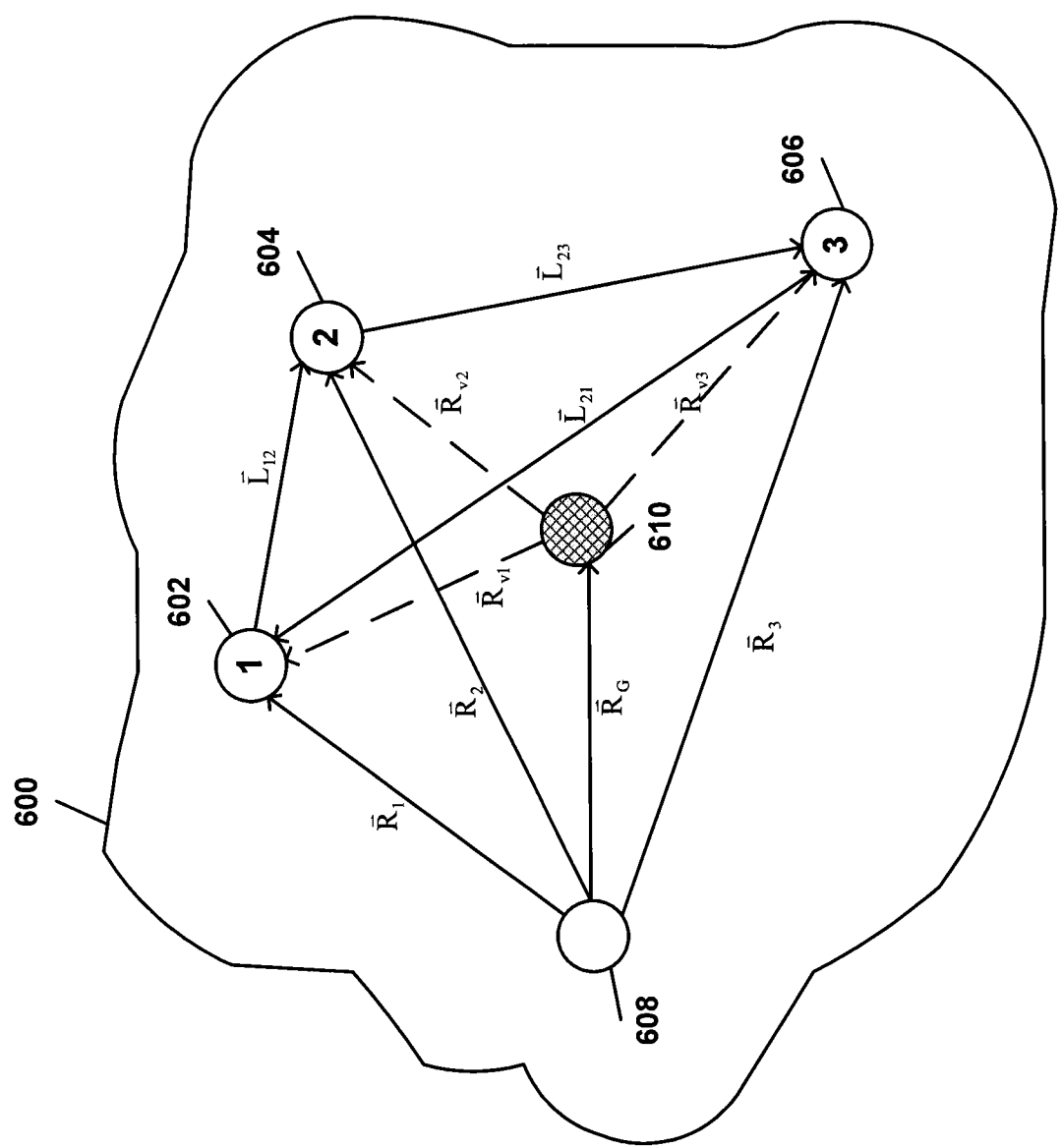
FIG. 6 is a schematic that shows a three-ring configuration according to one example.

FIG. 6 is a schematic that shows a three-ring configuration according to one example. FIG. 6 shows three rings 602, 604, 606 located inside a rigid body 600. Each of the three rings 602, 604, 606 may use the second configuration. Point 610 represents the CoG of the rigid body 600. 608 represents a fixed reference on the rigid body 600. $\vec{R}_1$, $\vec{R}_2$, $\vec{R}_3$ and $\vec{R}_G$ are position vectors between the fixed reference 608, and the rings 602, 604, 606 and the CoG 610. $\vec{L}_{12}$, $\vec{L}_{21}$, $\vec{L}_{23}$ are distance vector between the rings 602, 604, 606. $\vec{R}_{v1}$, $\vec{R}_{v2}$, $\vec{R}_{v3}$ are the position vector between the CoG 610 and the rings 602, 604, 606 respectively. Then, the following equations may be derived $$\vec{R}_1 - \vec{R}_G = \vec{R}_{v1}$$

$$\vec{R}_2 - \vec{R}_G = \vec{R}_{v2}$$

$$\vec{R}_3 - \vec{R}_G = \vec{R}_{v3} \tag{20}$$

Substituting equation (20) into equation (1) results in:

$$\vec{a}_{ri} - \dot{\vec{\Omega}} \times \vec{R}_i - \vec{\Omega} \times (\vec{\Omega} \times \vec{R}_i) = \vec{A}_b - \ddot{\vec{R}}_G - \dot{\vec{\Omega}} \times \vec{R}_G - 2\vec{\Omega} \times \dot{\vec{R}}_G - \vec{\Omega} \times (\vec{\Omega} \times \vec{R}_G) - \vec{g}_b \tag{21}$$

where, ($\vec{R}_i$) is the position of the ($i^{th}$) Ring with respect to the fixed reference 608 on the rigid body 600.

Recall that the gravitational gradient is given by equation (6) from which the gravity vector can be retrieved, in the body frame, and may be expressed as:

$$\vec{g}_b(t) = \begin{bmatrix} g_x \\ g_y \\ g_z \end{bmatrix} = \vec{g}_{b0}(t) + \int_0^t \Gamma^a \vec{V}_b \, dt \tag{22}$$

$$\vec{g}_{b0}(t) = DCM(t) * \vec{g}_{I0}$$

where ($\vec{V}_b$) is the body inertial velocity evaluated in the body frame, ($\vec{g}_{b0}$) is the gravity vector given at the initial position in the body frame and ($\vec{g}_{I0}$) is the gravity vector given at the initial position which is assumed to be known to certain accuracy in the inertial frame and (DCM) is the directional cosine matrix. When ($\vec{V}_b$) is small so that it does not violate the assumption of constant gravitational gradient within a finite number of successive sampling intervals as described in n U.S. Pat. No. 6,014,103 entitled "PASSIVE NAVIGATION SYSTEM", the entire disclosure of which is incorporated herein by reference. Then the gravity vector may be expressed as:

$$\vec{g}_b(t) = \begin{bmatrix} g_x \\ g_y \\ g_z \end{bmatrix} = \vec{g}_{b0}(t) + \Gamma^a \vec{S}(t) \tag{23}$$

where, ($\vec{S}$) is the inertial position of the vehicle measured in the body frame and its second derivative is the linear inertial acceleration of the vehicle ($\vec{A}_b$) measured at the center of gravity with respect to the body frame. The general equation is given as follows making use of (22):

$$\vec{a}_{ri} - \dot{\vec{\Omega}} \times \vec{R}_i - \vec{\Omega} \times (\vec{\Omega} \times \vec{R}_i) + \vec{g}_{b0} = \tag{24}$$
$$\vec{A}_b - \ddot{\vec{R}}_G - \dot{\vec{\Omega}} \times \vec{R}_G - 2\vec{\Omega} \times \dot{\vec{R}}_G - \vec{\Omega} \times (\vec{\Omega} \times \vec{R}_G) - \int_0^t \Gamma^a \vec{V}_b \, dt$$

In the case of constant gravity gradient, equation (24) can be expressed as:

$$\vec{a}_{ri} - \dot{\vec{\Omega}} \times \vec{R}_i - \vec{\Omega} \times (\vec{\Omega} \times \vec{R}_i) + \vec{g}_{b0} = \tag{25}$$
$$\vec{A}_b - \ddot{\vec{R}}_G - \dot{\vec{\Omega}} \times \vec{R}_G - 2\vec{\Omega} \times \dot{\vec{R}}_G - \vec{\Omega} \times (\vec{\Omega} \times \vec{R}_G) - \Gamma^a \vec{S}$$

Equation (24) can be discretized to approximate the integral-differential equation to bring about identifiability. It is clear from equations (24) and (25) that the CoG acceleration ($\ddot{\vec{R}}_G$) cannot be determined, at least using this approach. However, its velocity ($\dot{\vec{R}}_G$) can be determined. Using the skew-symmetric matrix notation instead of the cross product, the following models can be obtained:

Model I:

$$\vec{m}_i(k) = \vec{a}_{ri} - ([\dot{\vec{\Omega}}] + [\Omega \times])\vec{R}_i + \vec{g}_{b0} = \{\ddot{\vec{S}} - \ddot{\vec{R}}_G - \int_0^t \Gamma^a \vec{V}_b \, dt\} - 2[\Omega] \dot{\vec{R}}_G - ([\dot{\vec{\Omega}}] + [\Omega \times])\vec{R}_G \tag{26}$$

Model II:

$$\vec{m}_i(k) = \vec{a}_{ri} - ([\dot{\vec{\Omega}}] + [\Omega \times])\vec{R}_i + \vec{g}_{b0} = \{\ddot{\vec{S}} - \ddot{\vec{R}}_G - \Gamma^a \vec{S}\} - 2[\Omega] \dot{\vec{R}}_G - ([\dot{\vec{\Omega}}] + [\Omega \times])\vec{R}_G \tag{27}$$

Model III:

$$\vec{m}_i(k) = \vec{a}_{ri} - ([\dot{\vec{\Omega}}] + [\Omega \times])\vec{R}_i + \vec{g}_{b0} = \{\ddot{\vec{S}} - \int_0^t \Gamma^a \vec{V}_b \, dt\} - ([\dot{\vec{\Omega}}] + [\Omega \times])\vec{R}_G \tag{28}$$

Model IV:

$$\vec{m}_i(k) = \vec{a}_{ri} - ([\dot{\vec{\Omega}}] + [\Omega \times])\vec{R}_i + \vec{g}_{b0} = \{\ddot{\vec{S}} - \Gamma^a \vec{S}\} - ([\dot{\vec{\Omega}}] + [\Omega \times])\vec{R}_G \quad (29)$$

where:

$\vec{a}_{ri}$: is the acceleration measurement at the center of the $i^{th}$ ring, given by equation (19), $[\dot{\vec{\Omega}}]$ and $[\Omega \times]$: are given by equation (10), and both are known, $[\Omega]$: is the skew matrix of the angular velocity vector, and it is also known, $\vec{g}_{b0}$: is the initial gravity vector at time ($t_0$), given by equation (22), $\ddot{\vec{S}}$: is the inertial acceleration of the vehicle measured at CoG in the body frame, which is to be identified, and it is equivalent to $\vec{A}_b$.

$\ddot{\vec{R}}_G$ and $\dot{\vec{R}}_G$: are the acceleration and the velocity of the CoG respectively, which are to be identified, if appropriate, $\vec{R}_G$: is the position of CoG, which is to be identified, $\Gamma^a$: is the gravity gradient measured in the body frame given by equation (6), and it is known, $\vec{V}_b$: is the inertial velocity of the vehicle measured in the body frame, which is to be identified, and $\vec{S}$: is the inertial position of the vehicle measured in the body frame, which is to be identified.

In Models I and II, the CoG acceleration ($\ddot{\vec{R}}_G$), when it exists, affects the body inertial acceleration estimation ($\vec{A}_b = \ddot{\vec{S}}$). In Models III and IV, a simpler approach is taken by considering the CoG to be stationary, i.e. $\ddot{\vec{R}}_G = \dot{\vec{R}}_G = 0$. In equations (26)-(29), backward finite-divided-difference formulas may be used as given by equations (30)-(32) below to obtain a numerical accuracy equals to $O(h^2)$ where h is the sampling period.

$$\dot{f}(x_i) \cong \frac{3f(x_i) - 4f(x_{i-1}) + f(x_{i-2})}{2h} \quad (30)$$

$$\ddot{f}(x_i) \cong \frac{2f(x_i) - 5f(x_{i-1}) + 4f(x_{i-2}) - f(x_{i-3})}{h^2} \quad (31)$$

$$\int_0^t \Gamma^a \vec{V}_b \cdot dt \cong \sum_{i=1}^{N} \frac{h}{2} \left\{ \int_{t_i}^{t_{i+1}} \Gamma^a(t_i)\dot{\vec{S}}(t_i) + \Gamma^a(t_{i-1})\dot{\vec{S}}(t_{i-1}) \right\} \quad (32)$$

Hence, equation (26) can be given as follows when ($\ddot{\vec{R}}_G = 0$):

$$2h^2 m(k) + \frac{h^2}{2} \sum_{i=1}^{k-1} \{3\Gamma^a(i)\vec{S}(i) + (3\Gamma^a(i-1) - 4\Gamma^a(i))\vec{S}(i-1) + \quad (33)$$

$$(\Gamma^a(i) - 4\Gamma^a(i-1))\vec{S}(i-2) + \Gamma^a(i-1)\vec{S}(i-3)\} =$$

$$\left\{\left(4I - \frac{3h^2}{2}\Gamma^a(k)\right)\vec{S}(k) - (2h^2([\dot{\Omega}](k) + [\Omega \times](k)) + 6h[\Omega](k))\vec{R}_G(k)\right\} -$$

$$\left\{\left(10I + \frac{h^2}{2}(3\Gamma^a(k-1) - 4\Gamma^a(k))\right)\vec{S}(k-1) - (8h[\Omega](k))\vec{R}_G(k-1)\right\} +$$

$$\left\{\left(8I - \frac{h^2}{2}(\Gamma^a(k) - 4\Gamma^a(k-1))\right)\vec{S}(k-2) - (2h[\Omega](k))\vec{R}_G(k-2)\right\} -$$

$$\left\{\left(2I + \frac{h^2}{2}\Gamma^a(k-1)\right)\vec{S}(k-3)\right\}$$

Similarly, equation (27) can be given as follows using $O(h^2)$ and ($\ddot{\vec{R}}_G = 0$):

$$h^2 m(k) = \{(2I - h^2\Gamma^a(k))\vec{S}(k) - (h^2([\dot{\Omega}](k) + [\Omega \times](k)) + 3h[\Omega](k))\vec{R}_G(k)\} - \{5\vec{S}(k-1) - (4h[\Omega](k))\vec{R}_G(k-1)\} + \{4\vec{S}(k-2) - (h[\Omega](k))\vec{R}_G(k-2)\} - \{\vec{S}(k-3)\} \quad (34)$$

In addition, equation (28) may be expressed using $O(h^2)$ as:

$$2h^2 m(k) + \frac{h^2}{2} \sum_{i=1}^{k-1} \{3\Gamma^a(i)\vec{S}(i) + (3\Gamma^a(i-1) - 4\Gamma^a(i))\vec{S}(i-1) + \quad (35)$$

$$(\Gamma^a(i) - 4\Gamma^a(i-1))\vec{S}(i-2) + \Gamma^a(i-1)\vec{S}(i-3)\} =$$

$$\left\{\left(4I - \frac{3h^2}{2}\Gamma^a(k)\right)\vec{S}(k) - (2h^2([\dot{\Omega}](k) + [\Omega \times](k)))\vec{R}_G(k)\right\} -$$

$$\left\{\left(10I + \frac{h^2}{2}(3\Gamma^a(k-1) - 4\Gamma^a(k))\right)\vec{S}(k-1)\right\} +$$

$$\left\{\left(8I - \frac{h^2}{2}(\Gamma^a(k) - 4\Gamma^a(k-1))\right)\vec{S}(k-2)\right\} -$$

$$\left\{\left(2I + \frac{h^2}{2}\Gamma^a(k-1)\right)\vec{S}(k-3)\right\}$$

Equation (29) can be given as follows using $O(h^2)$:

$$h^2 m(k) = \{(2I - h^2\Gamma^a(k))\vec{S}(k) - (h^2[\dot{\Omega}](k) + [\Omega \times](k)))\vec{R}_G(k)\} - \{5\vec{S}(k-1)\} + \{4\vec{S}(k-2)\} - \{\vec{S}(k-3)\} \quad (36)$$

Regression forms of the above equations may be used in a QR-Decomposition based weighted recursive least squares (RLS) filer or the like to retrieve the unknown parameters. The regression form of equations (33) and (34) may be expressed as:

$$M(k) = [a_1, a_2, a_3, b_1, b_2, b_3, b_4][\vec{R}_G(k), \vec{R}_G(k-1), \vec{R}_G(k-2), \vec{S}(k), \vec{S}(k-1), \vec{S}(k-2), \vec{S}(k-3)]^T \quad (37)$$

The regression form of equations (35) and (36) may be expressed as:

$$M(k) = [a_1, b_1, b_2, b_3, b_4][\vec{R}_G(k), \vec{S}(k), \vec{S}(k-1), \vec{S}(k-2), \vec{S}(k-3)]^T \quad (38)$$

Figure 7:
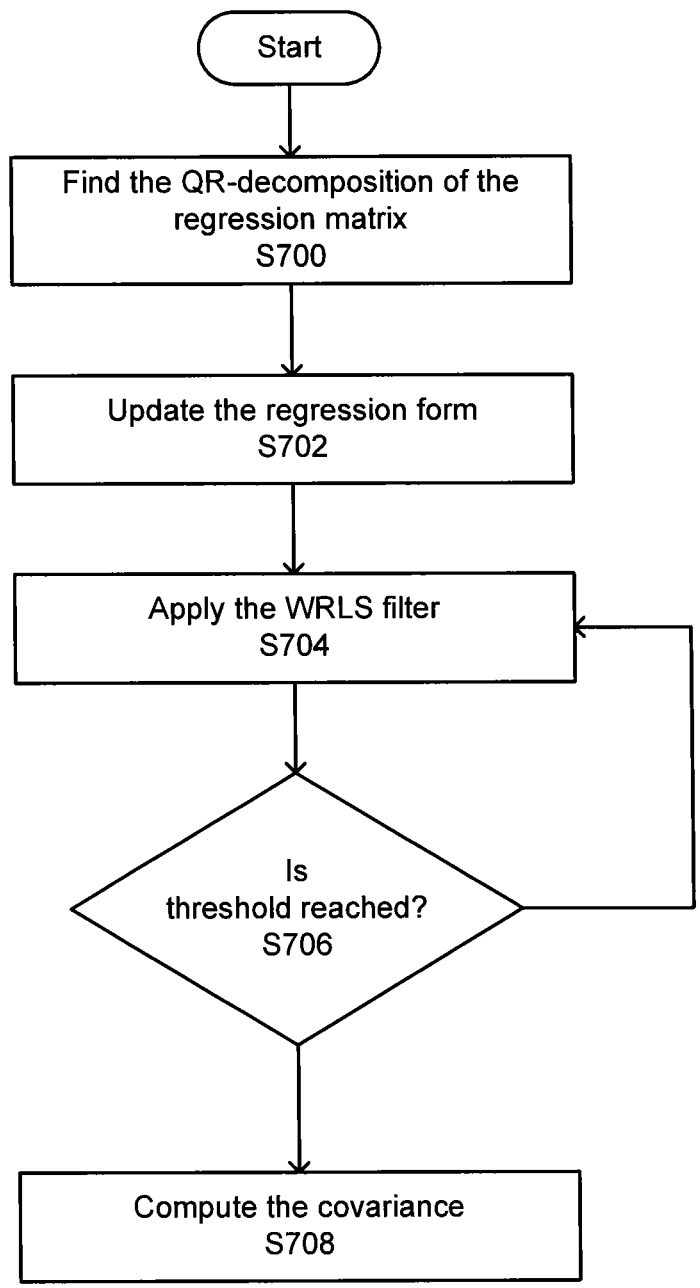
FIG. 7 is a flow chart for a QR-decomposition based on a weighted RLS (WRLS) filter according to one example.

FIG. 7 is a flow chart for a QR-decomposition based on a weighted RLS (WRLS) filter according to one example. Equations (37-38) can be implemented within a QR-D based WRLS scheme as follows: At step S700, the QR-decomposition of the regression matrix (D) to enhance its condition number is found. In other embodiments, other methods may be used such as Householder, Givens rotations, or the like as would be understood by one of ordinary skill in the art. At step S702, the regression form equations (37) and (38) are updated as follows:

$$\vec{M} = D\vec{x} = Q*R*\vec{x} \rightarrow Q^T*\vec{M} = R*\vec{x}$$

$$Q^T*\vec{M} = R*\vec{x} \rightarrow \vec{w} = R*\vec{x} \quad (39)$$

At step S704, the equation from step S702 are used in a WRLS scheme as follows:

$$K_{ki} = \frac{P_{(k-1)i} R_{ki}^T}{FF + \text{trace}(R_{ki} P_{(k-1)i} R_{ki}^T)} \quad (40)$$

$$\vec{e}_{ki}(k) = \vec{w}(k) - R_{ki} \hat{\vec{x}}_i(k-1)$$

$$\hat{\vec{x}}_{ki}(k) = \hat{\vec{x}}_{ki}(k-1) + K_{ki} \vec{e}_{ki}(k)$$

$$P_{ki} = \frac{1}{FF}(I - K_{ki} R_{ki}) P_{(k-1)i}$$

The following expression helps keeping the covariance matrix positive:

$$P_{ki} = 0.5*(P_{ki}^T + P_{ki})$$

Where, (i) denotes the ring index, i.e. i=1, 2, etc. . . . and k is the iteration index. At step S706, the processing circuitry may check whether the trace of the covariance matrix is larger than a threshold. In response to determining that the trace (Trace($P_{ki}$)>TH) then $$P_{ki} = \beta*\text{eye}(\text{length}(\text{Regression Vector})) \quad (41)$$

at step S708. The threshold value and β may be selected based on trial and error. In one embodiment, the threshold value and β may be determined based on past data. In other embodiments, the threshold value and β may be determined adaptively using the processing circuitry.

Compensation for the varying gravity must also be done before the accelerometers' measurements are made available to the INS mechanization. In one embodiment, the gravity effect is discretized as was shown in Models I-IV. Then, these models can be used with the QR-decomposition based WRLS, or the like, to estimate the CoG position/velocity, the inertial position, velocity and acceleration. The latter is corrected by removing the contribution of the gravity tensor from the estimated values by adding/subtracting the appropriate amount from $\vec{S}(k)$, $\vec{S}(k-1)$, $\vec{S}(k-2)$, and $\vec{S}(k-3)$.

Figure 8:
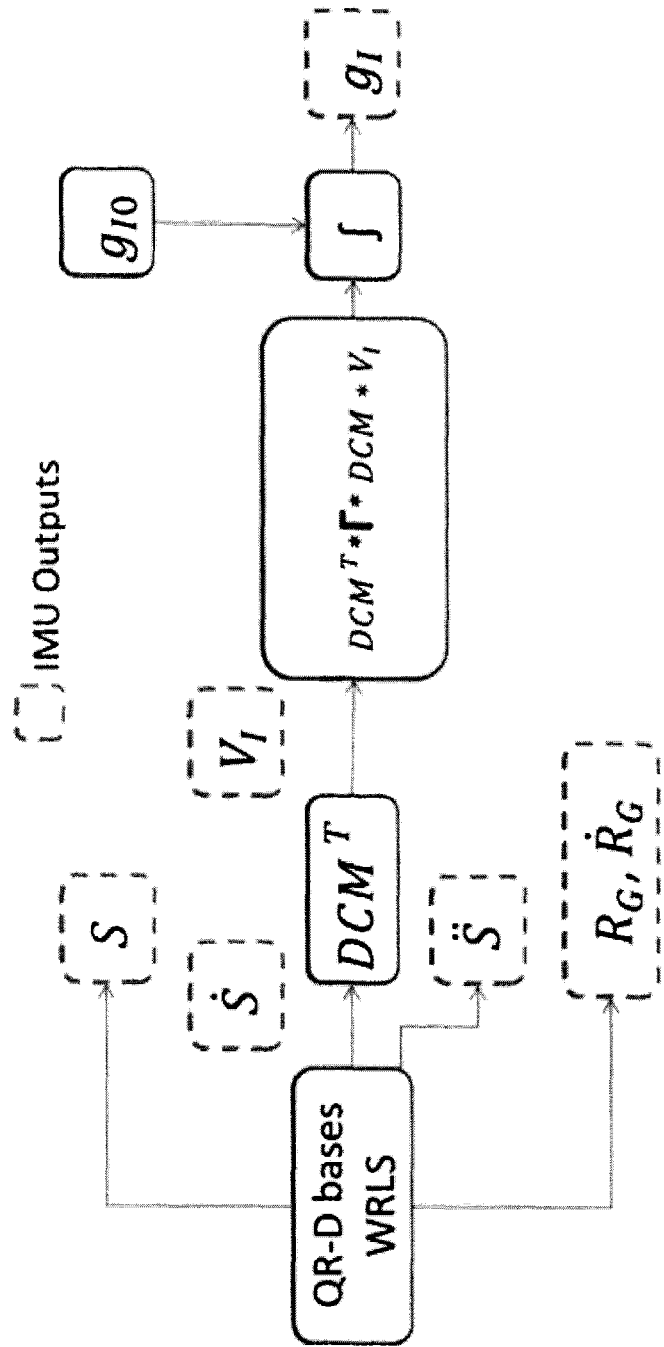
FIG. 8 is a block diagram that shows the calculation of inertial data and acceleration due to gravity according to one example.

FIG. 8 is a block diagram that shows the calculation of inertial data and gravitational acceleration according to one example. The calculation of the inertial data and the acceleration due to gravity can be estimated as described in A. H. Zorn, "A merging of system technologies: all-accelerometer inertial navigation and gravity gradiometry," Position Location and Navigation Symposium, IEEE, (2002) incorporated herein by reference in its entirety.

Figure 9:
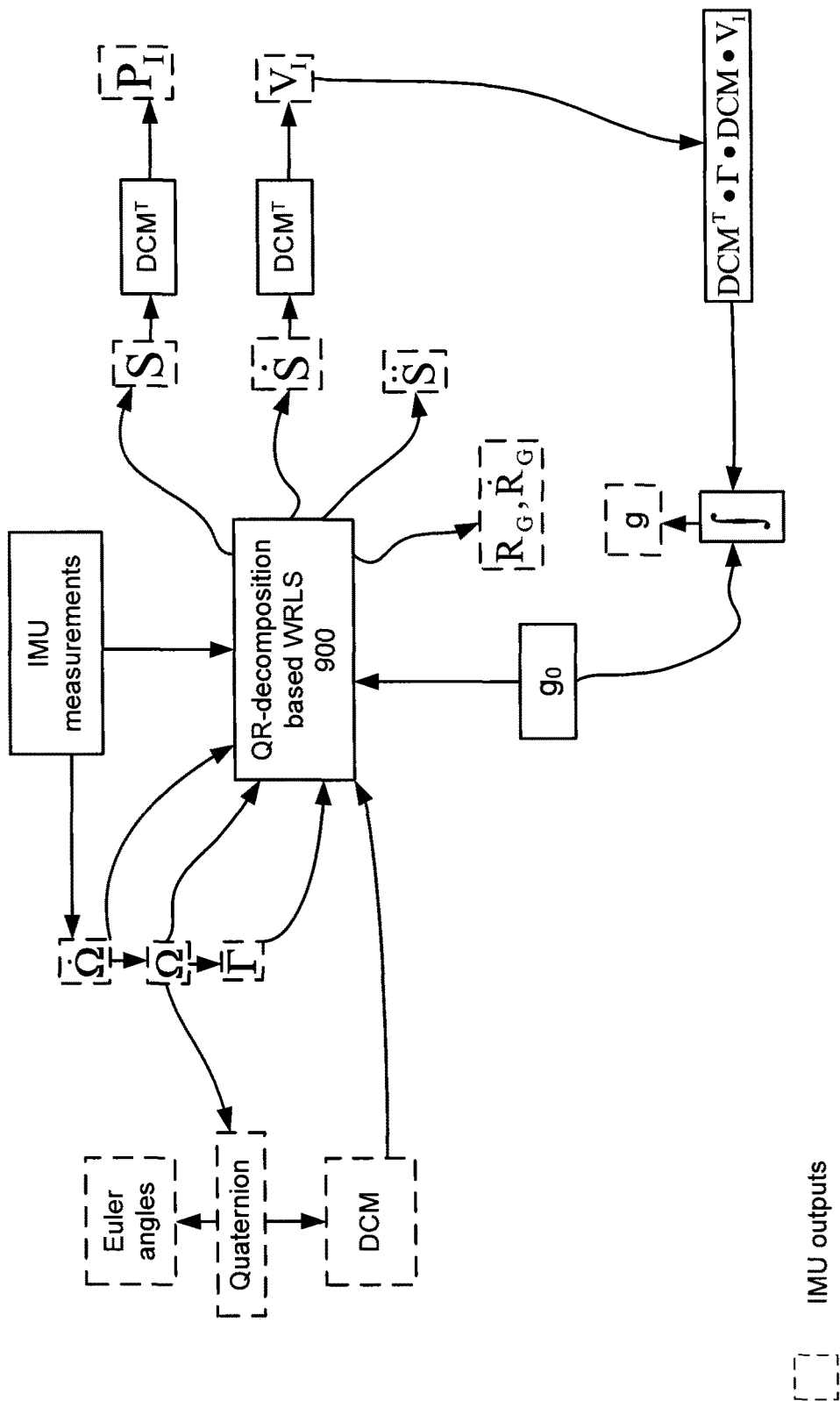
FIG. 9 is a block diagram that shows the steps by which the accelerometers' measurements are used according to one example.

FIG. 9 is a block diagram that shows the steps by which the accelerometers' measurements are used according to one example. FIG. 9 shows the flow of measurements and calculated data in the IMU 300 using the QR-decomposition based WRLS filter 900. The compensation for gravity and shift from CoG position are done simultaneously. The inertial data are readily available. In selected embodiments, the inertial data may be re-estimated using a dedicated filter based on Discrete Wiener Process Acceleration (DWPA) model.

The system and associated methodology of the present disclosure may be used with a plurality of navigation frames such as Earth centered earth fixed (ECEF) or the like. In other embodiments, the position, velocity and acceleration may be calculated independently of each other. The system and associated methodology may also include GPS measurements or the like. The equations may be modified to adopt needed navigation frames and components.

Figure 10:
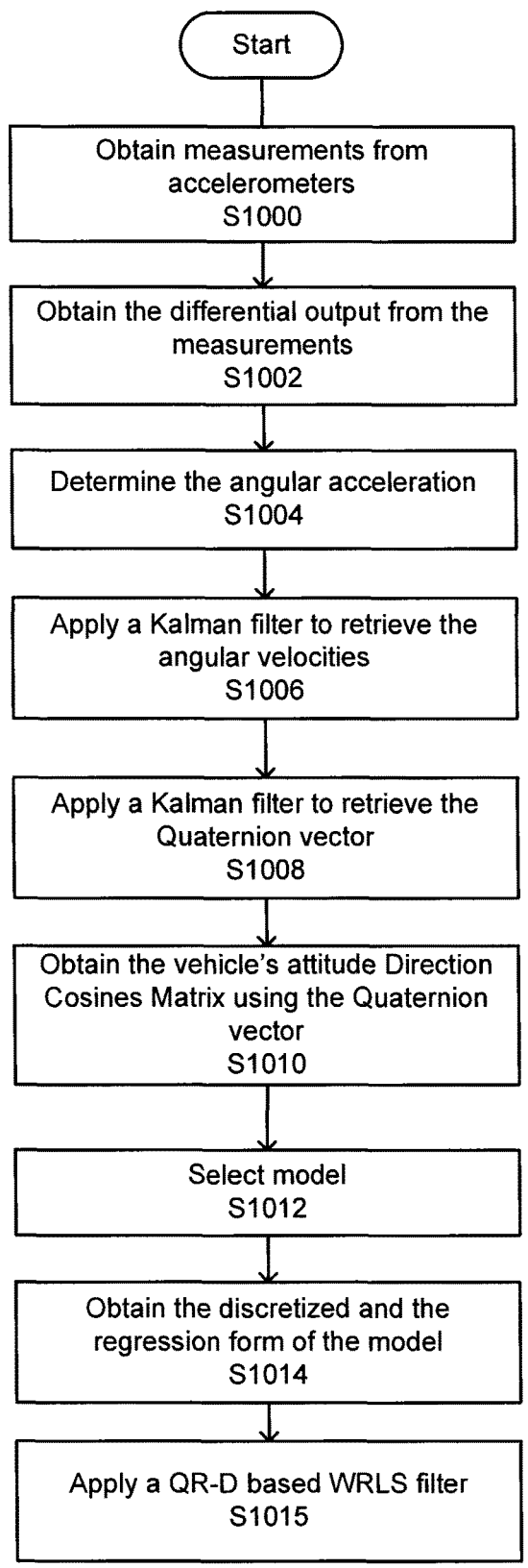
FIG. 10 is a flow chart showing a method for solving the navigation problem according to one example.

FIG. 10 is a flow chart showing a method for solving the navigation problem according to one example. At step S1000, the accelerometers' measurements are obtained from each of the accelerometers of the IMU. The accelerometer's measurement subjected to a gravity force and located away from the COG of the vehicle may be represented by equation (1). At step S1002, the differential outputs of the accelerometers' measurements are calculated as given in equations (2) and (3). At step S1004, the angular acceleration, using the equations given in table 1 and table 2 for the second and the first configuration, may be calculated. At step S1006, the angular velocities are retrieved using the norm-constrained Kalman filter. The norm-constrained Kalman filter is used because it allows direct estimation of the angular velocities without affecting the gravity tensor as shown in equation (15). The norm-constrained Kalman filter allows separating the estimations of both the angular velocity and the gravity tensor components into two steps and the avoiding of estimation drift through the usage of constraint measurements. Other filtering techniques such as a linear Kalman filter may be used as would be understood by one of ordinary skill in the art. At step S1008, the Quaternion vector is estimated using the norm constrained Kalman filter and using equations (17) and (18). At step S1010, the vehicle's attitude DCM is calculated from the Quaternion vector. Having the attitude estimated at step S1010, ensures the linear-in-parameter property of the identification problem as presented in equation (21). Equation (21) with its current format is not identifiable; because of the additive terms appearing in the expression, namely: $\vec{A}_b$, $\ddot{\vec{R}}_G$, and $\vec{g}_b$. In selected embodiments, $\ddot{\vec{R}}_G$ can be assumed to be 0. Equations (22) and (23) provides a relation between the inertial acceleration and the acceleration due to gravity based on the position as shown in equation (5). Equations (22-23) are two representatives of the gravity as a function of inertial velocity and position respectively. Both equations assume that the gravity includes two parts, namely: known and unknown. The known part depends on the initial value of the gravity just right before the system is started, and this value may be multiplied at each time instant by the DCM to compensate for the attitude changes. Doing that, the known part can now be used at the left hand side of equation (21). The unknown part, which resembles the change occurring in the gravity as the vehicle travels, needs to be identified so that it is kept in the right hand side of equation (21).

Equations (21-23) can be used to obtain equations (24-25) from which four main models are obtained. At step S1012, the appropriate model is selected. The model is selected based on the application of the system of the current disclosure. For example, Models I and III can be used when the vehicle is traveling with very high speed which may violate the assumption of constant gravity gradient between two successive intervals. At step S1014, the discretized and the regression form of the model are obtained as expressed by equations (33)-(36) and equations (37)-(38) respectively. Using discretization helps in capturing the changes in the parameters and finding all the inertial parameters at the same time. At step S1015, the QR-D based WRLS filter is applied to the regression form to retrieve the unknown parameters. Other forms and schemes may be used as well such as using adaptive techniques.

The existence of angular motion (velocity and/or acceleration) is essential for estimating the CoG position and its rate of change. When the angular motion does not exist, then the accelerometers' measurements are not affected by the CoG shift. Thus, the system of the proposed disclosure and associated methodology may be used with under/ground vehicles even when the surface is flat/inclined provided that initial attitude information is available.

The system and associated methodology of the present disclosure enables solving the navigation problem of the vehicle under the simultaneous action of varying unknown gravity force and center of gravity position. The method calculates navigation parameters such as inertial position, velocity and acceleration, angular velocity and acceleration, the attitude, estimating the position of center of gravity and its rate of change, estimating the acceleration due to gravity, and estimating the gravity tensor using only linear accelerometers.

Figure 12:
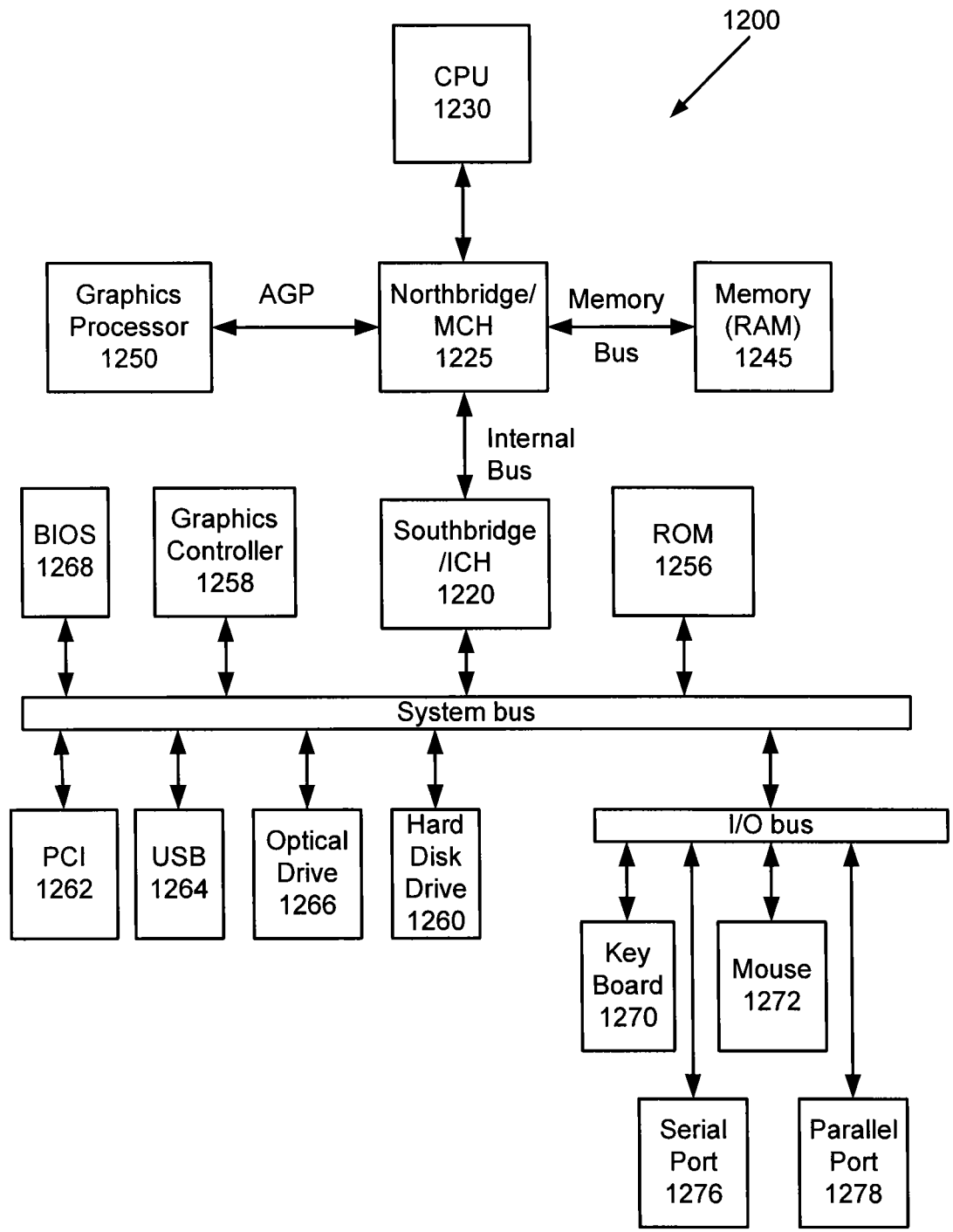
FIG. 12 is an exemplary block diagram of a data processing system according to one example.

In one embodiment, measurements from the IMUs may be sent via a network 1128 to a computer. In other embodiments, the IMUs may include processing circuitry to compute the navigation parameters. The IMU may include a data processing system, as shown in FIG. 12, to create a particular machine for implementing the above-noted process.

Figure 11:
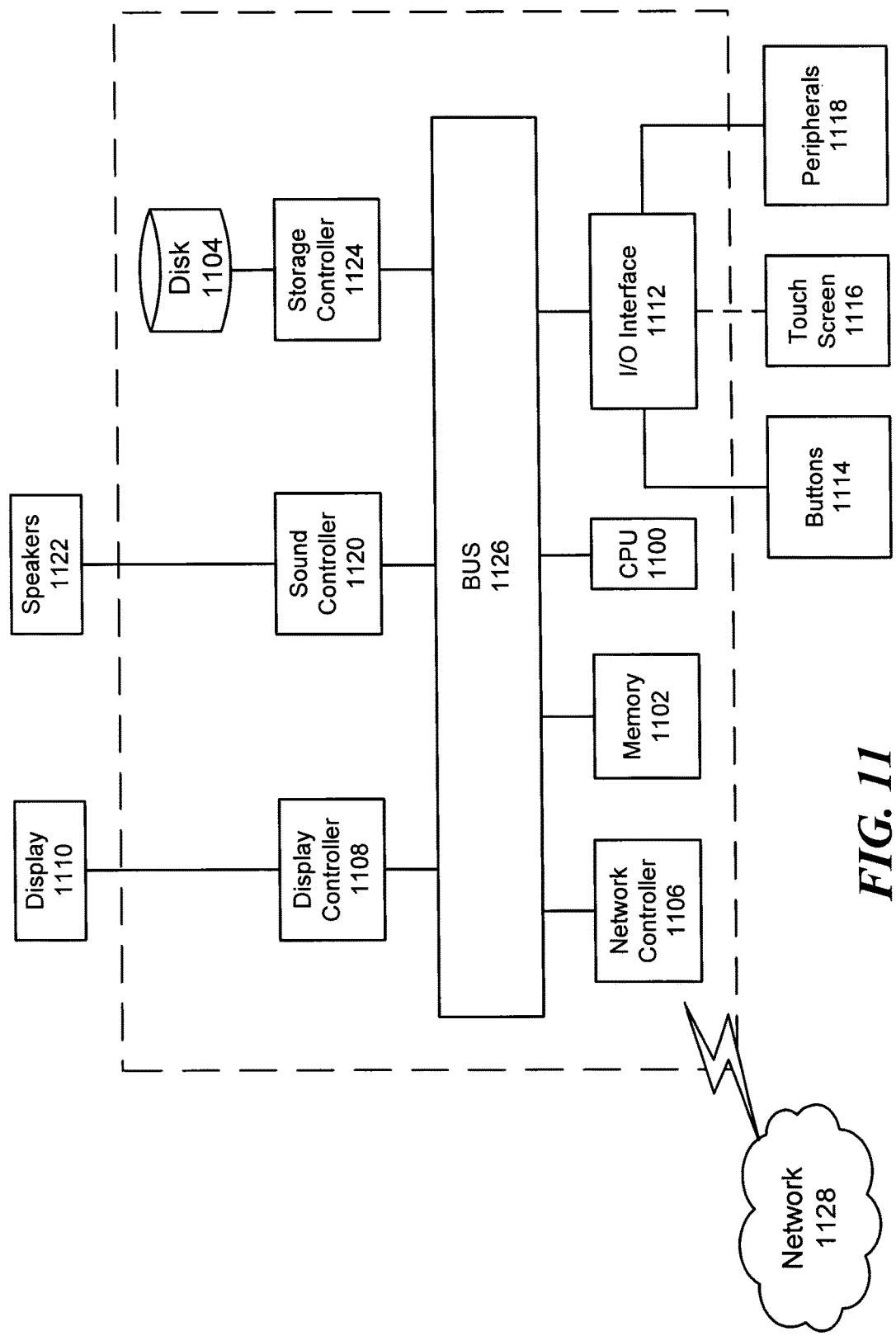
FIG. 11 is an exemplary block diagram of a computer according to one example.

Next, a hardware description of the computer according to exemplary embodiments is described with reference to FIG. 11. In FIG. 11, the computer includes a CPU 1100 which performs the processes described above/below. The process data and instructions may be stored in memory 1102. These processes and instructions may also be stored on a storage medium disk 1104 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer communicates, such as a server or computer.

Further, the claimed advancements may be provided as a utility application, background daemon, or component of an operating system, or combination thereof, executing in conjunction with CPU 1100 and an operating system such as Microsoft Windows 7, UNIX, Solaris, LINUX, Apple MAC-OS and other systems known to those skilled in the art.

The hardware elements in order to achieve the computer may be realized by various circuitry elements, known to those skilled in the art. For example, CPU 1100 may be a Xenon or Core processor from Intel of America or an Opteron processor from AMD of America, or may be other processor types that would be recognized by one of ordinary skill in the art. Alternatively, the CPU 1100 may be implemented on an FPGA, ASIC, PLD or using discrete logic circuits, as one of ordinary skill in the art would recognize. Further, CPU 1100 may be implemented as multiple processors cooperatively working in parallel to perform the instructions of the inventive processes described above.

The computer in FIG. 11 also includes a network controller 1106, such as an Intel Ethernet PRO network interface card from Intel Corporation of America, for interfacing with network 1128. As can be appreciated, the network 1128 can be a public network, such as the Internet, or a private network such as an LAN or WAN network, or any combination thereof and can also include PSTN or ISDN sub-networks. The network 1128 can also be wired, such as an Ethernet network, or can be wireless such as a cellular network including EDGE, 3G and 4G wireless cellular systems. The wireless network can also be WiFi, Bluetooth, or any other wireless form of communication that is known.

The computer further includes a display controller 1108, such as a NVIDIA GeForce GTX or Quadro graphics adaptor from NVIDIA Corporation of America for interfacing with display 1110, such as a Hewlett Packard HPL2445w LCD monitor. A general purpose I/O interface 1112 interfaces with a keyboard and/or mouse 1114 as well as a touch screen panel 1116 on or separate from display 1110. General purpose I/O interface also connects to a variety of peripherals 1118 including printers and scanners, such as an OfficeJet or DeskJet from Hewlett Packard.

A sound controller 1120 is also provided in the computer, such as Sound Blaster X-Fi Titanium from Creative, to interface with speakers/microphone 1122 thereby providing sounds and/or music.

The general purpose storage controller 1124 connects the storage medium disk 1104 with communication bus 1126, which may be an ISA, EISA, VESA, PCI, or similar, for interconnecting all of the components of the computer. A description of the general features and functionality of the display 1110, keyboard and/or mouse 1114, as well as the display controller 1108, storage controller 1124, network controller 1106, sound controller 1120, and general purpose I/O interface 1112 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 11.

FIG. 12 shows a schematic diagram of a data processing system, according to certain embodiments, for computing the navigation parameters. The data processing system is an example of a computer in which specific code or instructions implementing the processes of the illustrative embodiments may be located to create a particular machine for implementing the above-noted process.

In FIG. 12, data processing system 1200 employs a hub architecture including a north bridge and memory controller hub (NB/MCH) 1225 and a south bridge and input/output (I/O) controller hub (SB/ICH) 1220. The central processing unit (CPU) 1230 is connected to NB/MCH 1225. The NB/MCH 1225 also connects to the memory 1245 via a memory bus, and connects to the graphics processor 1250 via an accelerated graphics port (AGP). The NB/MCH 1225 also connects to the SB/ICH 1220 via an internal bus (e.g., a unified media interface or a direct media interface). The CPU Processing unit 1230 may contain one or more processors and even may be implemented using one or more heterogeneous processor systems.

Figure 13:
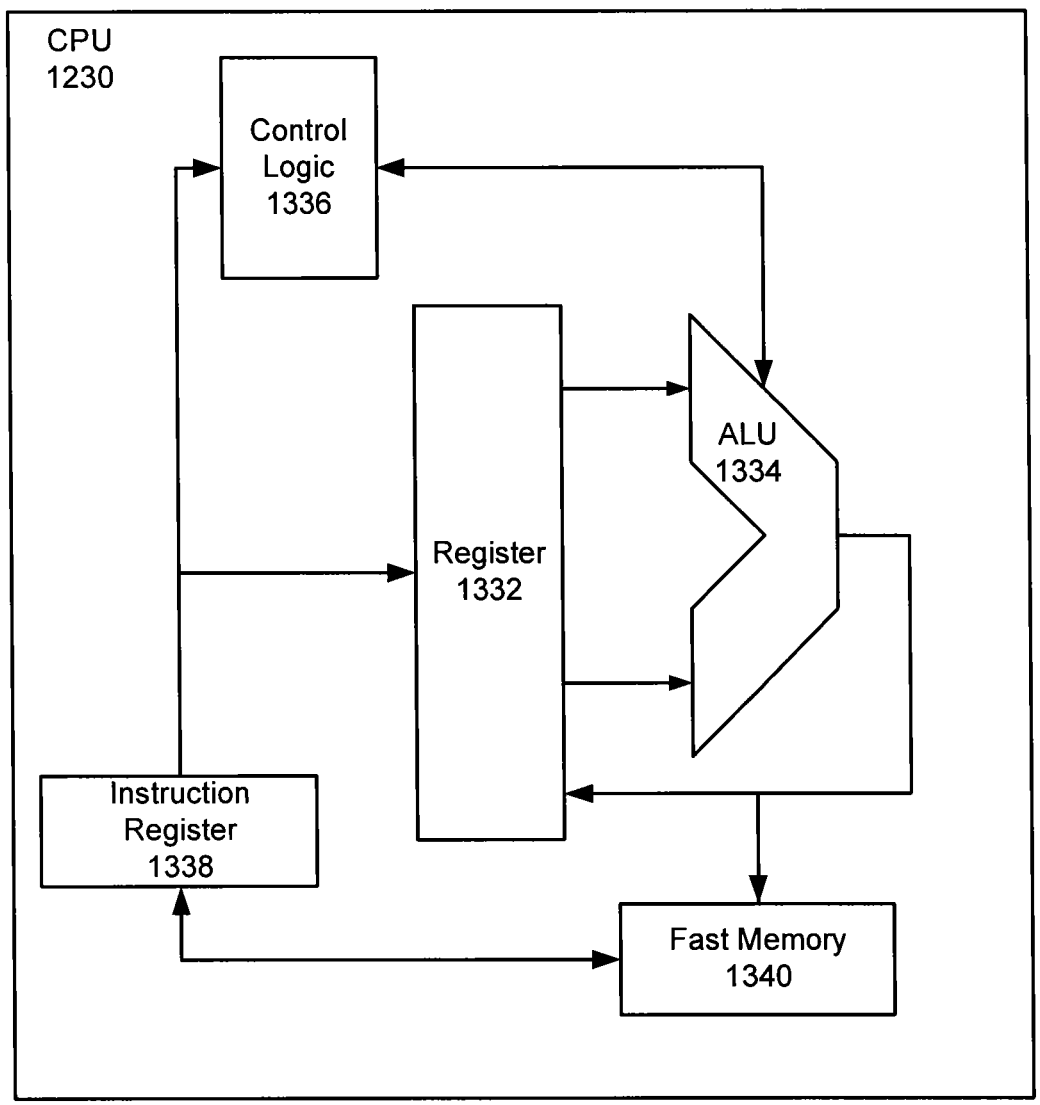
FIG. 13 is an exemplary block diagram of a central processing unit according to one example.

For example, FIG. 13 shows one implementation of CPU 1230. In one implementation, the instruction register 1338 retrieves instructions from the fast memory 1340. At least part of these instructions are fetched from the instruction register 1338 by the control logic 1336 and interpreted according to the instruction set architecture of the CPU 1230. Part of the instructions can also be directed to the register 1332. In one implementation, the instructions are decoded according to a hardwired method, and in another implementation, the instructions are decoded according a microprogram that translates instructions into sets of CPU configuration signals that are applied sequentially over multiple clock pulses. After fetching and decoding the instructions, the instructions are executed using the arithmetic logic unit (ALU) 1334 that loads values from the register 1332 and performs logical and mathematical operations on the loaded values according to the instructions. The results from these operations can be feedback into the register and/or stored in the fast memory 1340. According to certain implementations, the instruction set architecture of the CPU 1230 can use a reduced instruction set architecture, a complex instruction set architecture, a vector processor architecture, a very large instruction word architecture. Furthermore, the CPU 1230 can be based on the Von Neuman model or the Harvard model. The CPU 1230 can be a digital signal processor, an FPGA, an ASIC, a PLA, a PLD, or a CPLD. Further, the CPU 1230 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 12, the data processing system 1200 can include that the SB/ICH 1220 is coupled through a system bus to an I/O Bus, a read only memory (ROM) 1256, universal serial bus (USB) port 1264, a flash binary input/output system (BIOS) 1268, and a graphics controller 1258. PCI/PCIe devices can also be coupled to SB/ICH 1220 through a PCI bus 1262.

The PCI devices may include, for example, Ethernet adapters, add-in cards, and PC cards for notebook computers. The Hard disk drive 1260 and CD-ROM 1266 can use, for example, an integrated drive electronics (IDE) or serial advanced technology attachment (SATA) interface. In one implementation, the I/O bus can include a super I/O (SIO) device.

Further, the hard disk drive (HDD) 1260 and optical drive 1266 can also be coupled to the SB/ICH 1220 through a system bus. In one implementation, a keyboard 1270, a mouse 1272, a parallel port 1278, and a serial port 1276 can be connected to the system bust through the I/O bus. Other peripherals and devices that can be connected to the SB/ICH 1220 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

The hardware description above, exemplified by any one of the structure examples shown in FIGS. 11 and 12 constitutes or includes specialized corresponding structure that is programmed or configured to perform the algorithms shown in FIGS. 7 and 10. For example, the algorithms shown in FIGS. 7 and 10 may be completely performed by the circuitry included in the single device shown in FIG. 11 or the chipset as shown in FIG. 12.

A system which includes the features in the foregoing description provides numerous advantages to users. In particular, the vehicle inertial measurements and gradiometer functionalities are combined in an All-accelerometer IMU comprising only linear accelerometers with high precision. In addition, the present disclosure has the advantage of minimizing computation requirements and increasing processing speed by using a one ring configuration, in selected embodiments. In addition, the present disclosure provides an improvement to the technical field by calculating the navigation parameters under the simultaneous varying of the center of gravity position and unknown gravitational force. The system therefore controls navigation of the vehicle based on the navigation parameters in a more efficient and stable manner. In one embodiment, the system controls the vehicle's orientation (attitude) about the vehicle COG to ensure the aircraft vehicle stability.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:
1. A method for determining navigation parameters of a vehicle, the method comprising:
  receiving measurements from accelerometers;
  calculating, using processing circuitry, differential accelerometers measurements as a function of the measurements from the accelerometers;
  calculating, using the processing circuitry, an angular acceleration as a function of the differential accelerometers measurements under varying center of gravity position and unknown varying gravitational force with anomaly;
  calculating, using the processing circuitry, the square of the magnitude of an angular velocity as a function of the differential accelerometers measurements; and
  calculating, using the processing circuitry, the navigation parameters by determining the angular velocity using a Kalman filter as a function of the angular acceleration and the square of the magnitude of the angular velocity, wherein the calculation of the navigation parameters is fully operated in a passive navigation system.
2. The method of claim 1, wherein the navigation parameters includes an inertial position, a velocity, an acceleration, an angular velocity, an angular acceleration, attitude, a position of a center of gravity and its rate of change, gravity tensor, and a gravitational acceleration.
3. The method of claim 2, wherein the angular velocity estimation is isolated from gravity tensor estimation via a constrained filtering technique.
4. The method of claim 2, wherein calculating the gravity tensor includes applying:

$$\Gamma_{xx} = -\frac{(A_{1x} - A_{2x})}{2\mu} - \Omega_z^2 - \Omega_y^2$$

$$\Gamma_{yy} = -\frac{(A_{3y} - A_{4y})}{2\mu} - \Omega_z^2 - \Omega_x^2$$

-continued $$\Gamma_{zz} = -\frac{(A_{5z} - A_{6z})}{2\mu} - \Omega_x^2 - \Omega_y^2$$

$$\Gamma_{xy} = -\frac{(A_{3x} - A_{4x}) + (A_{1y} - A_{2y})}{4\mu} + \Omega_x \Omega_y$$

$$\Gamma_{xz} = -\frac{(A_{5x} - A_{6x}) + (A_{1z} - A_{2z})}{4\mu} + \Omega_x \Omega_z$$

$$\Gamma_{yz} = -\frac{(A_{3z} - A_{4z}) + (A_{5y} - A_{6y})}{4\mu} + \Omega_z \Omega_y$$

where $A_j$ refers to the jth accelerometer measurement, $\mu$ is a distance between the accelerometers and a point about which the accelerometers are symmetrically disposed, and $\Omega$ is the angular velocity.

5. The method of claim 2, wherein the calculating of the navigation parameters uses one or more of the following models $$\vec{m}_i(k) = \vec{a}_{ri} - ([\dot{\Omega}] + [\Omega \times])\vec{R}_i + \vec{g}_{b0} = \{\ddot{\vec{S}} - \ddot{\vec{R}}_G - \int_0^t \Gamma^a \vec{V}_b dt\} - 2[\Omega]\vec{R}_G - ([\dot{\Omega}] + [\Omega \times])\vec{R}_G,$$

$$\vec{m}_i(k) = \vec{a}_{ri} - ([\dot{\Omega}] + [\Omega \times])\vec{R}_i + \vec{g}_{b0} = \{\ddot{\vec{S}} - \ddot{\vec{R}}_G - \Gamma^a \vec{S}\} - 2[\Omega]\vec{R}_G - ([\dot{\Omega}] + [\Omega \times])\vec{R}_G,$$

$$\vec{m}_i(k) = \vec{a}_{ri} - ([\dot{\Omega}] + [\Omega \times])\vec{R}_i + \vec{g}_{b0} = \{\ddot{\vec{S}} - \int_0^t \Gamma^a \vec{V}_b dt\} - ([\dot{\Omega}] + [\Omega \times])\vec{R}_G, \text{ and}$$

$$\vec{m}_i(k) = \vec{a}_{ri} - ([\dot{\Omega}] + [\Omega \times])\vec{R}_i + \vec{g}_{b0} = \{\ddot{\vec{S}} - \Gamma^a \vec{S}\} - ([\dot{\Omega}] + [\Omega \times])\vec{R}_G$$

where $\vec{a}_{ri}$: is an acceleration measurement at the center of the $i^{th}$ ring,
$[\Omega]$: is a skew matrix of an angular velocity vector,
$\vec{g}_{b0}$: is an initial gravity vector at time ($t_0$),
$\vec{A}_b$: is an inertial acceleration of the vehicle measured at a center of gravity of a body frame of the vehicle,
$\ddot{\vec{R}}_G$ and $\dot{\vec{R}}_G$: are the acceleration and the velocity of the center of gravity respectively
$\vec{R}_G$: is the position of the center of gravity,
$\Gamma^a$: is a gravity gradient measured in the body frame,
$\vec{V}_b$: is an inertial velocity of the vehicle,
$\vec{S}$: is an inertial position of the vehicle,
$[\dot{\Omega}]$ is expressed as $$[\dot{\Omega}] = \begin{bmatrix} 0 & -\dot{\Omega}_z & \dot{\Omega}_y \\ \dot{\Omega}_z & 0 & -\dot{\Omega}_x \\ -\dot{\Omega}_y & \dot{\Omega}_x & 0 \end{bmatrix},$$

and
$[\Omega \times]$ is expressed as $$[\Omega \times] = \begin{bmatrix} -\Omega_z^2 - \Omega_y^2 & \Omega_x \Omega_y & \Omega_x \Omega_z \\ \Omega_x \Omega_y & -\Omega_z^2 - \Omega_x^2 & \Omega_z \Omega_y \\ \Omega_x \Omega_z & \Omega_z \Omega_y & -\Omega_y^2 - \Omega_x^2 \end{bmatrix}.$$

6. The method of claim 2, wherein calculating the gravitational acceleration includes applying:

$$\vec{g}_1(t) = \int_0^t DCM^T \Gamma^a \vec{V}_b dt$$

where the DCM is the directional cosine matrix, $\Gamma^a$ is a gravity gradient, and $\vec{V}_b$ is an inertial velocity of the vehicle measured in the body frame of the vehicle.

7. The method of claim 2, wherein the accelerometers are arranged in one or more distributed diamond configurations.

8. The method of claim 7, wherein the processing circuitry is embedded in the one or more distributed diamond configurations.

9. The method of claim 2, wherein the navigation parameters are represented using different navigation frames.

10. The method of claim 2, wherein the calculating of the navigation parameters is operated in combination with aided navigation systems.

11. The method of claim 1, wherein the vehicle is one of an air vehicle, an underwater vehicle, an underground vehicle, or a space vehicle.

12. The method of claim 1, further comprising:
computing a gravity tensor of the vehicle; and
sending the gravity tensor to a host application to provide computer guidance to avoid obstacles.

13. The method of claim 1, wherein the accelerometers are arranged in two or more rings.

14. The method of claim 13, wherein calculating the angular acceleration includes applying:

$$\dot{\Omega}_x = \frac{1}{4\mu}(A_{1,1z} - A_{1,2z} - A_{1,3y} + A_{1,4y})$$

$$\dot{\Omega}_y = \frac{1}{2\mu}(A_{1,3x} - A_{1,4x}) - \frac{1}{L}\left(\sum_{j=1}^{4} A_{1,jz} - \sum_{j=1}^{4} A_{2,jz}\right)$$

$$\dot{\Omega}_z = -\frac{1}{2\mu}(A_{1,1x} - A_{1,2x}) + \frac{1}{L}\left(\sum_{j=1}^{4} A_{1,jy} - \sum_{j=1}^{4} A_{2,jy}\right)$$

where $A_{i,j}$ refers to the jth accelerometer measurement in the ith ring, $\mu$ is a distance between the accelerometers and a point about which the accelerometers are symmetrically disposed, $\dot{\Omega}$ is the angular acceleration and L is a fixed distance between the rings.

15. The method of claim 1, wherein the accelerometers are arranged in a diamond configuration.

16. The method of claim 15, wherein calculating the angular acceleration includes applying:

$$\dot{\Omega}_x = \frac{1}{4\mu}(A_{3z} - A_{4z} - A_{5y} + A_{6y})$$

$$\dot{\Omega}_y = \frac{1}{4\mu}(A_{5x} - A_{6x} - A_{1z} + A_{2z})$$

$$\dot{\Omega}_z = \frac{1}{4\mu}(A_{1y} - A_{2y} - A_{3x} + A_{4x})$$

where $A_j$ refers to the jth accelerometer measurement, $\dot{\Omega}$ is the angular acceleration, and $\mu$ is a distance between the accelerometers and a point about which the accelerometers are symmetrically disposed.

17. The method of claim 1, wherein the Kalman filter is a norm constrained Kalman filter.

18. The method of claim 1, wherein the measurements are received from eighteen or more accelerometers.

19. A system for determining navigation parameters of a vehicle, the system comprising:

processing circuitry configured to
receive measurements from accelerometers,
calculate differential accelerometers measurements based on the measurements,
calculate an angular acceleration based on the differential accelerometers measurements under varying center of gravity position and unknown varying gravitational force with anomaly,
calculate the square of the magnitude of an angular velocity as a function of the differential accelerometers measurements, and
calculate the navigation parameters by determining the angular velocity using a Kalman filter as a function of the angular acceleration and the square of the magnitude of the angular velocity, wherein the calculation of the navigation parameters is fully operated in a passive navigation system.

20. An inertial navigation unit comprising:
six or more accelerometers; and
processing circuitry configured to
receive measurements from the six or more accelerometers,
calculate differential accelerometers measurements based on the measurements,
calculate an angular acceleration based on the differential accelerometers measurements under varying center of gravity position and unknown varying gravitational force with anomaly,
calculate the square of the magnitude of an angular velocity as a function of the differential accelerometers measurements, and
calculate the navigation parameters by determining the angular velocity using a Kalman filter as a function of the angular acceleration and the square of the magnitude of the angular velocity wherein the calculation of the navigation parameters is fully operated in a passive navigation system.

* * * * *